US011860839B2

(12) United States Patent
Roy

(10) Patent No.: US 11,860,839 B2
(45) Date of Patent: *Jan. 2, 2024

(54) TUNING EXTERNAL INVOCATIONS UTILIZING WEIGHT-BASED PARAMETER RESAMPLING

(71) Applicant: Oracle International Corporation, Redwood Shores, CA (US)

(72) Inventor: Debajyoti Roy, Pleasanton, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/991,613

(22) Filed: Nov. 21, 2022

(65) Prior Publication Data

US 2023/0093199 A1 Mar. 23, 2023

Related U.S. Application Data

(63) Continuation of application No. 17/343,112, filed on Jun. 9, 2021, now Pat. No. 11,550,767.

(51) Int. Cl.
*G06F 16/215* (2019.01)
*G06N 20/00* (2019.01)
*G06F 16/23* (2019.01)
*G06F 16/21* (2019.01)

(52) U.S. Cl.
CPC ......... *G06F 16/215* (2019.01); *G06F 16/217* (2019.01); *G06F 16/2386* (2019.01); *G06N 20/00* (2019.01)

(58) Field of Classification Search
CPC .. G06F 16/215; G06F 16/217; G06F 16/2386; G06N 20/00

USPC ........................................................ 707/703
See application file for complete search history.

(56) References Cited

U.S. PATENT DOCUMENTS

| 9,400,976 | B1* | 7/2016 | Courtright | ........... G06Q 20/102 |
| 11,167,153 | B2* | 11/2021 | Bokrantz | ............. A61N 5/1031 |
| 11,550,767 | B2 | 1/2023 | Roy | |
| 2019/0187997 | A1* | 6/2019 | Gupta | ................... G06F 9/5061 |

(Continued)

OTHER PUBLICATIONS

U.S. Appl. No. 17/343,112, "Notice of Allowance", dated Aug. 18, 2022, 8 pages.

*Primary Examiner* — Hicham Skhoun
(74) *Attorney, Agent, or Firm* — Invoke

(57) ABSTRACT

Techniques are disclosed for tuning external invocations utilizing weight-based parameter resampling. In one example, a computer system determines a plurality of samples, each sample being associated with a parameter value of a plurality of potential parameter values of a particular parameter. The computer system assigns weights to each of the parameter values, and then selects a first sample for processing via a first external invocation based on a weight of the parameter value of the first sample. The computer system then determines feedback data associated with a level of performance of the first external invocation. The computer system adjusts the weights of the parameter values of the particular parameter based on the feedback data. The computer system then selects a second sample of the plurality of samples to be processed via execution of a second external invocation based on the adjustment of weights of the parameter values.

20 Claims, 10 Drawing Sheets

(56) References Cited

U.S. PATENT DOCUMENTS

2020/0364358 A1* 11/2020 Karia ................. G06Q 20/3829
2020/0372682 A1* 11/2020 Kim ........................ G06N 3/08

* cited by examiner

| 301 → Batch size 302 | Response (seconds) 304 | Non-normalized Importance weight 306 | Normalized Importance weight 308 |
|---|---|---|---|
| 10 | 5 | 0.5 | 0.25 |
| 20 | 4 | 0.6 | 0.3 |
| 30 | 3 | 0.8 | 0.4 |
| 40 | 10 | 0.1 | 0.05 |
| 50 | Fail | 1.00E-05 | 5.00E-06 |

| Iteration 402 | Sampled/Re-sampled Batch sizes 404 | Rows processed 406 |
|---|---|---|
| 1 408 | [10,20,30,40,50], [] | 150 |
| 2 410 | [10,10,10,40,40], [20] | 130 |
| 3 412 | [10,10,10,10,50], [30] | 120 |
| 4 414 | [10,10,10,10,20], [40] | 90 |
| 5 416 | [10,10,40,40,40], [20] | 160 |
| 6 418 | [10,40,40,40,40], [30] | 160 |
| 7 420 | [40,40,40,40,40], [10] | 170 |
| 8 422 | [40,40,40,40,40], [10] | 20 |

*FIG. 4*

TUNING EXTERNAL INVOCATIONS UTILIZING WEIGHT-BASED PARAMETER RESAMPLING

CROSS-REFERENCE TO RELATED APPLICATIONS

The present application is a continuation of U.S. application Ser. No. 17/343,112, filed Jun. 9, 2021, entitled "TUNING EXTERNAL INVOCATIONS UTILIZING WEIGHT-BASED PARAMETER RESAMPLING", the entire contents of which is incorporated by reference as if fully set forth herein, under 35 U.S.C. § 120.

BACKGROUND

Cloud services computing systems are often tasked with, among other computing operations, enriching data. For example, a service provider may manage a data service (e.g., website) that receives a large amount of input from visitors to the website. For example, visitors may post information (e.g., a blog post, etc.) on the website that is processed and/or stored by the service provider (e.g., as records in a database). In some cases, the service provider may want to have one or more records analyzed, and thus enrich the data based on the results of the analysis. For example, the service provider may want to analyze text within a visitor blog post to uncover linguistic patterns, which may subsequently be used to improve features of the service provider (e.g., text recognition, providing relevant feature recommendations, etc.).

In some cases, to more efficiently process the large volume of data, the service provider may offload at least part of this analysis to a cloud services computing system (e.g., which may use specialized hardware and/or software to process the data). For example, the service provider may send a volume of records to a cloud server, whereby the cloud server may analyze each record, and enrich data for each record based on patterns detected. While these remote function calls that request the cloud server to process the data may improve processing efficiency, challenges remain. For example, including a large number of records per request may sometimes improve processing efficiency, while at other times it may lower efficiency (e.g., depending on network conditions at the time of the request, computing resources available on the cloud server, etc.). In some cases, there may be multiple variables associated with a request that are difficult to dynamically predict, thus making it challenging to optimally tune requests.

BRIEF SUMMARY

Techniques are provided for tuning external invocations utilizing weight-based parameter resampling.

In one embodiment, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method. The computer—implemented method also includes receiving, by a computer system, a data record of a plurality of data records collectively associated with one or more user profiles of a service provider, the data record corresponding to user input provided to the service provider and intended for data enrichment via an external invocation. The method also includes determining, by the computer system, a plurality of parameter values that are potential values of a particular parameter that is associated with executing external invocations. The method also includes determining, by the computer system, a first sample of a plurality of samples, the first sample including at least the data record and corresponding to a batch of user inputs intended for data enrichment, the first sample being associated with a first parameter value of the potential values of the particular parameter, and where each sample of the plurality of samples is assigned to one of the plurality of parameter values. The method also includes determining, by the computer system, respective weights of parameter values of the plurality of parameter values, a first weight of the first parameter value associated with a probability of selecting a sample having the first parameter value. The method also includes selecting, by the computer system, the first sample for processing via a first external invocation of the external invocations based at least in part on the first weight. The method also includes determining, by the computer system, feedback data associated with a level of performance of the first external invocation. The method also includes adjusting, by the computer system, weights of the parameter values of the particular parameter based at least in part on the feedback data. The method also includes selecting, by the computer system, a second sample of the plurality of samples to be processed via execution of a second external invocation based at least in part on a second weight associated with a second parameter value of the second sample, the selection performed based at least in part on the adjustment of weights of the parameter values. Other embodiments of this aspect include corresponding computer systems, apparatus, and computer programs recorded on one or more computer storage devices, each configured to perform the actions of the methods.

One general aspect includes a computer system. The computer system also includes a memory may include computer-executable instructions. The system also includes one or more processors in communication with the memory and configured to access the memory and execute the computer-executable instructions to perform, at least: receiving a data record of a plurality of data records collectively associated with one or more user profiles of a service provider, the data record corresponding to user input provided to the service provider and intended for processing via an external invocation; determining a plurality of parameter values that are potential values of a particular parameter that is associated with executing external invocations; determining a first sample of a plurality of samples, the first sample including at least the data record and corresponding to a batch of user inputs intended for data enrichment, the first sample being associated with a first parameter value of the potential values of the particular parameter and where each sample of the plurality of samples is assigned to one of the plurality of parameter values; determining respective weights of parameter values of the plurality of parameter values, a first weight of the first parameter value associated with a probability of selecting a sample having the first parameter value; selecting the first sample for processing via a first external invocation of the external invocations based at least in part on the first weight; determining feedback data associated with a level of performance of the first external invocation; adjusting weights of the parameter values of the particular parameter based at least in part on the feedback data; and selecting a second sample of the plurality of samples to be processed via execution of a second external invocation based at least in part on a second weight associated with a second parameter value of the second sample, the selection performed based at least in part on the adjustment of weights of the parameter values. Other embodiments of this aspect include corresponding computer systems, apparatus, and computer programs recorded on one or more computer storage devices, each configured to perform the actions of the methods.

One general aspect includes one or more non-transitory computer-readable storage media may include computer-executable instructions that. The one or more non-transitory computer-readable storage media also includes receiving a data record of a plurality of data records collectively associated with one or more user profiles of a service provider, the data record corresponding to user input provided to the service provider and intended for processing via an external invocation; determining a plurality of parameter values that are potential values of a particular parameter that is associated with executing external invocations; determining a first sample of a plurality of samples, the first sample including at least the data record and corresponding to a batch of user inputs intended for data enrichment, the first sample being associated with a first parameter value of the potential values of the particular parameter, and where each sample of the plurality of samples is assigned to one of the plurality of parameter values; determining respective weights of parameter values of the plurality of parameter values, a first weight of the first parameter value associated with a probability of selecting a sample having the first parameter value; selecting the first sample for processing via a first external invocation of the external invocations based at least in part on the first weight; determining feedback data associated with a level of performance of the first external invocation; adjusting weights of the parameter values of the particular parameter based at least in part on the feedback data; and selecting a second sample of the plurality of samples to be processed via execution of a second external invocation based at least in part on a second weight associated with a second parameter value of the second sample, the selection performed based at least in part on the adjustment of weights of the parameter values. Other embodiments of this aspect include corresponding computer systems, apparatus, and computer programs recorded on one or more computer storage devices, each configured to perform the actions of the methods.

BRIEF DESCRIPTION OF THE DRAWINGS

FIG. 4 is another simplified block diagram illustrating an example technique for tuning external invocations utilizing weight-based parameter resampling, according to some embodiments.

DETAILED DESCRIPTION

Figure 1:
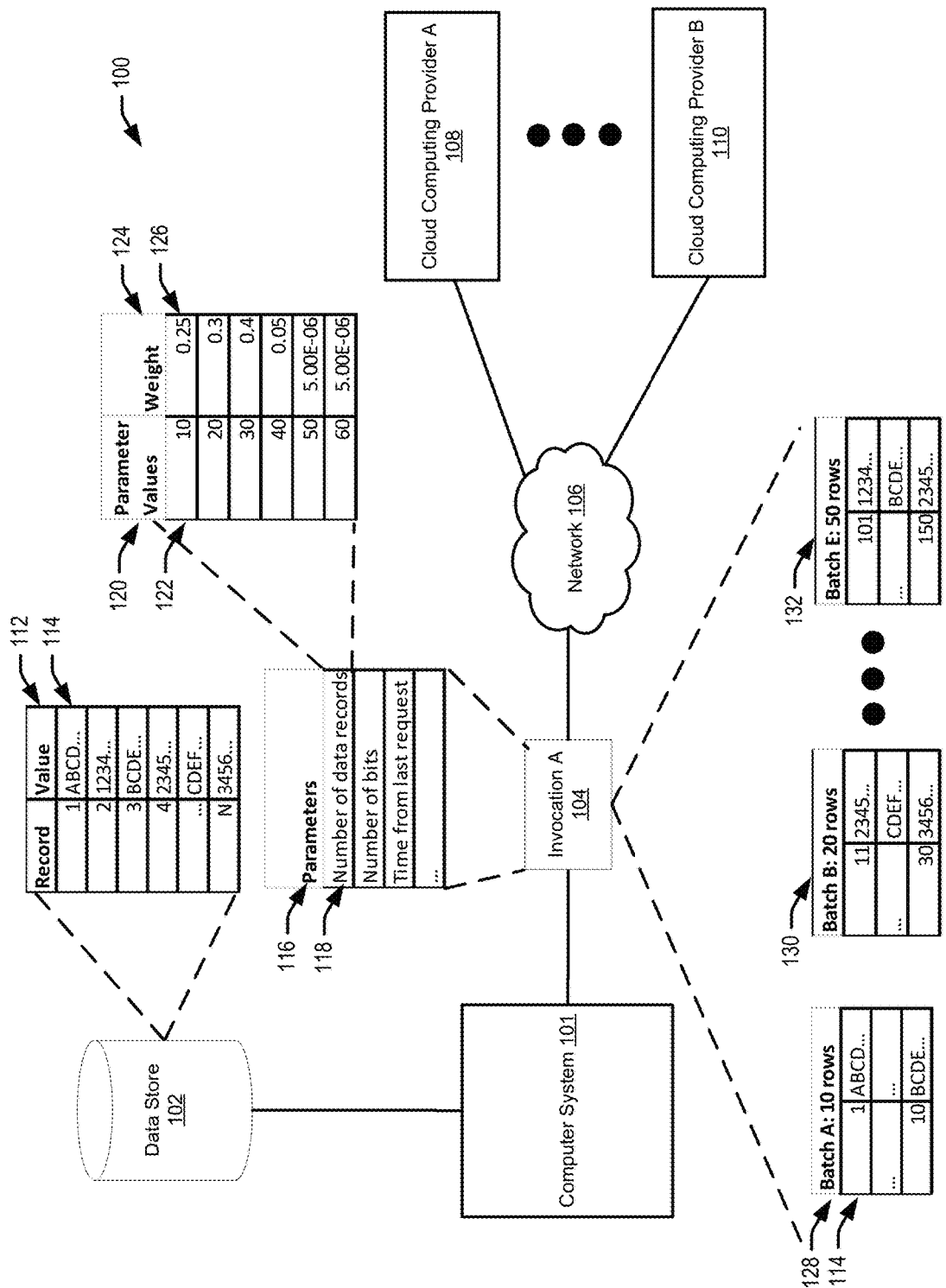
FIG. 1 is a simplified block diagram illustrating an example environment for tuning external invocations utilizing weight-based parameter resampling, according to some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure provide techniques for tuning external invocations utilizing weight-based parameter resampling. Consider an example in which a computer system manages aspects of a data pipeline related to invocation of remote functions to process data. These remote functions may be deployed (e.g., and/or executed) within a distributed environment (e.g., a cloud computing environment) that is external to the computer system, for example, connected via a network. The computer system may receive a plurality of data records (e.g., respectively corresponding to text fields from blog posts) that are intended for data enrichment based on analysis performed by a remote function of the distributed environment. To mitigate the initialization cost involved with invoking the remote function, the computer system may determine to perform invocations in batches of data records. In this example, the optimal batch size for efficient data processing may vary over time, for example, related to network and/or computing resource availability at a given time. Accordingly, the computer system may be tasked with tuning the respective batch size parameter for one or more batches to be efficiently processed with each new invocation (e.g., iteration), based on information learned from the previous invocation.

For example, the computer system may determine a set of potential parameter values (e.g., batch size values, such as ten data records, twenty data records, etc.) associated with the batch size parameter. The computer system may then partition the plurality of data records into a plurality of samples, so that each record is assigned to a particular sample, and whereby the sample size of a sample corresponds to a particular batch size parameter value of the set of potential parameter values. The computer system may then assign weights to each of the batch size parameter values. The weight of a batch size parameter value may be associated with a probability (e.g., 30%) of selecting a sample of the particular batch size value (e.g., ten data records). The computer system may then select a first sample from the plurality of samples based on the weight for the batch size of the first sample. The computer system may then execute a first external invocation by invoking the remote function, whereby the first sample (e.g., among other samples similarly selected for the first external invocation) is included as input to the remote function. The computer system may determine feedback data associated with the performance of the first external invocation. For example, the feedback data may indicate whether the first sample (and/or other samples) was successfully processed (e.g., enriched) and/or the respective response times for each sample. The computer system may then adjust weights of the set of potential batch size values based on the feedback data. The computer system may then select a second sample (e.g., having a particular batch size) to be processed as part of a second external invocation, whereby the selection is based in part on the adjusted weights. Accordingly, the computer system may proceed with a series of external invocations as more batches are input into the data pipeline, each invocation adjusting weights based on feedback from the previous iteration, until the full set of data records are processed. In at least this way, the computer system may coordinate efficient processing of data records via the data pipeline while also quickly tuning the process to adapt to changing conditions (e.g., fluctuating network and/or computing resource availability) over time.

To further illustrate, consider a scenario in which a cloud services provider (CSP) provides a service to one or more customers, for example, including a social media service (SMS). The SMS customer (e.g., an online service provider) may receive a large number of user inputs (e.g., online posts) each day from users of the service. In this example, each post may correspond to a data record (e.g., a row) of one or more data fields (e.g., text fields). Accordingly, the SMS may determine to have a large number of data records processed. Each data record may vary, for example, according to a total number of bytes (e.g., and/or bits), a number of text characters per data field, a number of non-empty data fields, etc. A computer system may be provisioned (e.g., by the CSP) to the SMS (e.g., on premises of the SMS), whereby the computer system may be tasked with coordinating enrichment (and/or other processing) of data records received by the SMS. For example, the computer system may coordinate invocation of a remote function to be executed by a remote server(s) of the CSP. In this example, the remote server may utilize specialized hardware optimized for text analysis and/or include a trained machine learning (ML) model (e.g., a neural network). The ML model (and/or other suitable algorithms) may be executed upon invocation of the remote function, whereby, upon receiving one or more data records from the computer system via the external invocation, the ML model may analyze text from a particular data field of the data record, determine supplementary information from the data record (e.g., a subject matter of a particular string of text of the data record), enrich the data record by associating the supplementary information with the particular data field of the data record, and then provide the enriched data record back to the computer system in a response message. It should be understood that any suitable data enrichment (and/or processing via external invocations) may be performed according to techniques described herein, for example, including text, image, and/or video analysis and/or augmentation.

As described above, the remote server may provide one or more remote functions that may be respectively invoked by the computer system via an external invocation (e.g., a remote function call over a network and/or a suitable data bus), whereby the computer system may provide one or more data records as input to the remote function. In some embodiments, the remove server may enable the computer system to batch a subset of data records as part of an external invocation, for example, to mitigate against initialization costs per external invocation. In some embodiments, the computer system may provide a plurality of batches (e.g., which may also/alternatively be described as "samples") as part of a particular external invocation. In some embodiments, a particular sample may be associated with one or more parameters that are related to providing the particular sample as input for the external invocation. In this example, a particular parameter may correspond to a batch size (e.g., a sample size), which may indicate a number of data records included in the batch. As described further herein, any suitable number and/or type of parameters may be associated with a particular sample and/or an external invocation of the remote function. This may include, for example, a batch size (e.g., a number of data records per batch), a time interval between transmission of samples of a particular external invocation, a number of bits (e.g., and/or bytes) associated with a particular sample, etc.

To efficiently coordinate the data enrichment process, the computer system may perform operations that enable the computer system to automatically adjust (e.g., tune) one or more parameters per external invocation. As described herein, these parameter adjustments may enable the computer system to more optimally execute external invocations, while taking into account a variety of factors that may (or may not) change over time. These factors may include, but are not limited to, network resource availability, computing resource availability, cloud provider policies (e.g., payload size limits, request rates), etc.

Utilizing the batch size parameter as a representative example parameter that may be automatically tuned (e.g., among samples) between invocations, the computer system may determine a set of potential parameter values for a batch size (e.g., ten data records per batch, twenty data records, thirty data records, etc.). In some embodiments, this set may be a fixed (and/or discrete) set of values. In some embodiments, a number of values of this set of values may be referred to as a population size. For example, in this case, the population size may be five (e.g., ten, twenty, thirty, forty, and fifty data records, respectively corresponding to members of the population). Continuing with the above illustration, the computer system may then determine a plurality of samples. As described above, each sample may correspond to a particular parameter value (e.g., a particular batch size) and may be generated from one or more data records of the plurality of data records. In some embodiments, the computer system may assign weights to each of the batch size values, whereby a weight may be associated with a probability of selecting a sample of a particular batch size. For example, a batch size of ten rows may be assigned a weight of 0.30 (e.g., 30%), a batch size of twenty rows may be assigned a weight of 0.20 (e.g., 20%), etc. In some embodiments, the initial weights (e.g., prior to a first external invocation) may be set to substantially similar (e.g., the same) values across the set of parameter values. This may indicate that, initially, the computer system does not have data indicating which parameter value (e.g., which particular batch size) is likely to perform better, given the current network conditions and/or computing resource availability of the remote server. The computer system may then select a set of samples (e.g., for example, five batches) for a first external invocation (e.g., a first iteration) based on the initial weights, and then execute the first external invocation. For example, the computer system may invoke the remote function in parallel (e.g., for increased processing efficiency) for each sample of the set of samples for the first iteration. In some embodiments, the computer system may invoke the remote function serially for each sample of the set of samples, It should be understood that, in some embodiments described herein, an external invocation may alternatively be referred to as an iteration, and may include parallel and/or serially execution of one or more remote functions (e.g., and/or calls to the same remote function) for respective sample processing as part of the iteration. In some embodiments a number of the set of samples may be determined by the computer system according to any suitable method (e.g., based on the total number of data records to be processed and/or administratively configured).

Continuing with the illustration, the computer system may receive feedback data associated with a level of performance of the first external invocation. For example, the feedback data may be associated with whether a particular sample of the first iteration was successfully processed or otherwise the remote function returned a failure code. In another example, the feedback data may be associated with a response time interval, indicating how long it took for the particular batch to be processed and/or the data enrichment results to be received. The computer system may analyze (e.g., measure) the feedback data for each of the samples of the first iteration, and then adjust the weights of the plurality of parameter values according to the measurements. For example, suppose that a batch size of ten data records had a response time of one second (e.g., in this case, the fastest turnaround time), while a batch size of fifty records consistently experienced a failure for the given iteration (e.g., due to exceeding payload policy limits for the particular remote server). In this example, the computer system may increase the weight of the parameter value corresponding to ten data records, and/or correspondingly decrease the weight of the parameter value corresponding to fifty data records. The computer system may similarly adjust the weights of the different parameter values based on the measurements (e.g., respective sample response times) from the previous iteration.

The computer system may then select a new set of samples for a second external invocation (e.g., a second iteration) based on the updated weights. In some embodiments, the new set of samples may include a similar (e.g., same) number of samples as the previous iteration, but may contain samples with a different distribution of batch sizes from the previous iteration, reflecting the adjusted weights for the population of parameter values. For example, continuing with the illustration above, the computer system may select an increased number of samples that each have batch sizes of ten data records, while selecting a decreased number of samples that have batch sizes of fifty data records (e.g., based on the relative adjustments in weights). In some embodiments, because the selection (e.g., re-sampling) of samples for the second external invocation (and/or other external invocations) is done with replacement, samples with the same batch size may be selected more than once (e.g., out of a given population of batch sizes). For example, if the batch size of ten records performed significantly better than other batch sizes for a previous iteration, the corresponding weight may be increased such that the next sampling for the next iteration may include a higher number of samples with ten records each. Accordingly, the result of the re-sampling may result in a posterior probability distribution in accordance with the updated weights of the parameter values. The computer system may then execute the second external invocation with the new set of samples. The computer system may repeat these iterations until the plurality of data records has been enriched.

In some embodiments, one or more additional samples may be optionally processed as part of an iteration (e.g., an external invocation). These one or more additional samples may be alternatively be referred to herein as "exploratory samples," and may optionally supplement (e.g., be processed together with, in the same iteration) the set of samples that were sampled with replacement according to the weights, as described above. For example, suppose that with respect to the second iteration (e.g., the second external invocation) described above, the weight adjustments resulted in the weight for the batch size parameter value of fifty records being reduced to a small number (e.g., close to zero), corresponding to a small probability that batch sizes with this parameter value may be selected. In this case, the re-sampling with replacement process may select the new set of samples whereby no (or few) batch sizes of fifty data records are selected. Accordingly, there is a possibility that, in the absence of mitigating action by the system, the weight for the fifty data record batch size may remain perpetually low, and thus that batch size may be continuously excluded (e.g., "starved") from being selected. To mitigate against the possibility that the process described remains in a local minima (e.g., precluded from exploring new optimum weights for parameter values), the system may select the one or more additional ("exploratory") samples independently from the current value of the weights. For example, in some embodiments, a number of additional samples may be selected as a percentage (e.g., a fixed percentage, such as 20%) of the population size. For example, in a case where the percentage is 20% and the population is five (e.g., five parameter values, in the current example), the number of exploratory samples per iteration may be set to one. In some embodiments, the additional samples may be selected according to a uniform probability distribution. In some embodiments, the additional samples may be selected whereby the respective parameter values (e.g., batch sizes) of the additional samples are not represented in the plurality of samples that was selected based on the adjusted weights. Any suitable method may be used to select the exploratory samples. In this way, the system may continuously explore new optimal parameter values, while mitigating the possibility of starving other values from being selected for exploration.

Embodiments of the present disclosure provide several technical advantages over conventional systems. For example, as described herein, distributed data pipelines often have a highly unpredictable nature, whereby network resource availability, computing resource availability, and/or cloud provider policies may be continuously changing. In these cases, choosing optimal perform parameters (e.g., how many data records to batch per external invocation) may be difficult to efficiently achieve via conventional approaches. For example, some of these approaches may not generalize well to be able to tune parameters for which the optimal values are regularly fluctuating. Some conventional approaches may require a significant amount of time and/or computing resources to learn an optimal policy. Also, some approaches may require increased system complexity, for example, storing learned parameters over multiple iterations.

Techniques described herein provide an efficient way to continuously adapt to the stochastic nature of a cloud computing environment, where conditions may be regularly changing. For example, conducting measurements according to techniques describe herein may be done in parallel (e.g., within a distributed environment context). Also, techniques may enable the system to efficiently adjust weights per iteration to be used in a next iteration. Accordingly, the reaction time to be able to recover from faults (e.g., where a particular batch size may fail) and/or adapt to slower response times may be significantly reduced. For example, the system may quickly adjust the weights and select batch sizes in a subsequent iteration that are less likely to produce faults and/or more likely to produce faster response times. In another example, techniques described herein efficiently scale to handle multi-variate parameter tuning problems. For example, in some embodiments, the system may use a fixed population size that corresponds to the one or more parameters being measured. Accordingly, the system may efficiently scale (e.g., constant time) to handle additional parameters being measured. The system may also be able to handle a wider variety of parameters for which the optimal values may, respectively, be regularly fluctuating. In yet another example, techniques described herein may reduce system complexity at least in part because the techniques may not necessitate storage of learned parameters. For example, weights can be adjusted with each iteration based on results from the previous iteration, without requiring a complex process for storing and/or learning from extensive historical data. Furthermore, as described herein, techniques may enable the system to continually explore new optimal values, based in part on using exploratory samples to mitigate the risk of remaining in a local minima state (e.g., whereby some population members may be perpetually "starved" from being selected).

For clarity of illustration, embodiments described herein may typically refer to automatically tuning parameters of external invocations within a distributed system context, whereby a computer system conducts an external invocation over a physical network (e.g., over the Internet) to invoke a remote function on a separate device (e.g., a remote server). However, embodiments should not be construed to be so limiting. For example, the remote function may be deployed in a virtual computing environment. In one example, remote function may be deployed on the same physical device as a virtual machine that invokes the remote function, but may execute on a different virtual machine (and/or a different virtual private cloud, utilizing a virtual network). In another example, embodiments described herein may typically refer to an example parameter that corresponds to a batch size (e.g., a number of data records (e.g., rows) for a given sample). However, any suitable parameter may be utilized to perform techniques herein, including, but not limited to, a request rate, a payload size per sample, a number of concurrent requests, etc.

FIG. 1 is a simplified block diagram illustrating an example environment for tuning external invocations utilizing weight-based parameter resampling, according to some embodiments. In diagram 100 of FIG. 1, several elements are depicted, including a data store 102, a computer system 101, a network 106, a cloud computing provider A 108, and a cloud computing provider B 110. In this example, computer system 101 may be tasked with coordinating processing (e.g., enrichment) of data records. For example, as described further herein, the computer system 101 may receive a plurality of data records from the data store 102, which may (or may not) be associated with the computer system 101. In this example, the computer system 101 and/or data store 102 may be associated with a service provider (e.g., an online service provider, such as an SMS). The service provider may regularly receive input from users (e.g., text inputs, images, videos, audio files, etc.) as online posts to a website, which subsequently are stored as data records to the data store 102. In some embodiments, each data record may be associated with a user profile of a user of the service provider. The computer system 101 may then manage/execute a sequence of iterations (e.g., external invocations) of one or more remote functions that are deployed to a cloud services provider (e.g., cloud computing provider A 108 and/or cloud computing provider B 110). For each external invocation, one or more samples (e.g., which may alternatively be referred to as a "batches," each batch including one or more data records) may be included as input to be processed (e.g., enriched with supplementary information). In some embodiments, the enriched data records may be returned in a response message(s) to the computer system 101. As described herein, the computer system 101 may measure feedback data from each iteration (e.g., response times, failures to respond, etc.), and then automatically adjust (e.g., tune) parameters, for example, by adjusting weights associated with parameter values of the one or more parameters. These adjusted weights may then be used to coordinate the next iteration (e.g., including coordinating the selection of samples). This automatic tuning of parameters may be performed over successive iterations until the plurality of data records has been enriched. Accordingly, embodiments may enable a more efficient end-to-end process for implementing a data processing pipeline.

Turning to FIG. 1 in further detail, in some embodiments, the data store 102 may correspond to any suitable computing system that maintains (e.g., stores) data records. For example, the data store 102 may include a database 112 of data records. The data store 102 may receive user input (e.g., based on online posts to the website of the service provider) and then store the user input (e.g., text, images, videos, and/or any suitable input) as a data record of the data store 102. For example, as depicted in FIG. 1, database 112 contains a plurality of data records (e.g., 1 through N), with data record 114 (e.g., "Record 1, with Value "ABCD . . . "") corresponding to a representative data record. It should be understood that a data record may include any suitable number of data fields, data types per data field, and/or utilize any suitable format (e.g., plain-text, compressed, suitable encryption format, etc.). Also, the data records may be received from any suitable source, including, but not limited to, user input via an online website post, manual text entry, bulk upload of data records to the data store 102, etc.

In some embodiments, the computer system 101 may be any suitable computing device. For example, computer system 101 may be a physical device (e.g., a server computer). In some embodiments, the computer system 101 may correspond to a virtual machine, for example, executing in a cloud computing environment. As described above, in some embodiments, the computer system 101 may (or may not) be associated with the data store 102. For example, the computer system 101 and/or data store 102 may both be associated with a service provider (e.g., an online service provider, such as an SMS). In some embodiments, the computer system 101 may include the data store 102 as a component of the computer system 101. Any suitable association between the computer system 101 and the data store 102 may be utilized to perform techniques herein. For example, as user input is received and stored as data records into the data store 102, the computer system 101 may retrieve data records from the data store 102 (e.g., from database 112) and then manage a process for enriching the data records.

In some embodiments, data records may be received and/or processed (e.g., enriched) according to any suitable cadence. For example, in some embodiments, the data store 102 may continuously receive new user input, whereby the computer system 101 receives (e.g., retrieves) data records from the data store 102 as new records arrive, and then queues the data records for processing (e.g., data enrichment by an external source, such as cloud computing provider A 108 or B 110). In some embodiments, the computer system 101 may receive a plurality of data records (e.g., a large set of data records, for example, a billion data records) from the data store 102. For example, the plurality of data records may be received once per day (and/or week, month, etc.). In any case, and, as described further herein, the computer system 101 may then determine how to efficiently batch received data records so as to achieve more optimal processing times via a sequence of external invocations.

In some embodiments, network 106 may include any suitable communication path or channel such as, for instance, a wire or cable, fiber optics, a telephone line, a cellular link, a radio frequency (RF) link, a WAN or LAN network, the Internet, or any other suitable medium. The network 106 may include any one or a combination of many different types of networks, such as cable networks, the Internet, wireless networks, cellular networks, and other private and/or public networks. In some embodiments, network 106 may include and/or be connected to a virtual network, as described further herein. In some embodiments, for example, in a case where the computer system 101 corresponds to a virtual machine, the virtual machine may execute an external invocation (e.g., a remote function call) over a virtual network, which may involve the same (or different) physical computing resources as the physical device upon which the virtual machine is executing.

In some embodiments, cloud computing provider A 108 and cloud computing provider B respectively correspond to representative remote computing devices (e.g., clusters of servers in the cloud) that are external (e.g., physically and/or virtually) from the computer system 101, for example, being accessed via the network 106. In some embodiments, a cloud computing provider operates within a distributed computing environment. In some embodiments, a particular cloud computing provider (and/or the associated distributed environment) may have different (or similar) characteristics when compared to other cloud computing providers. For example, using cloud computing provider A 108 as a representative example, cloud computing provider A may operate a particular set of hardware and/or software (e.g., for example, specialized hardware, such as specialized Graphics Processing Units (GPUs) and/or specialized Tensor Processing Units (TPUs)), which may be different from (or similar to) cloud computing provider B 110. In some embodiments, cloud computing provider A may have different (or similar) networking and/or computing resources available, compared to other computing providers that are connected (e.g., via network 106) to computer system 101. For example, at a particular period in time, cloud computing provider A may be receiving a large amount of data records from one or more computer systems (e.g., multiple customers) for data enrichment, in which case the network 106 connection to cloud computing provider A may be congested and/or the available computing resources of cloud computing provider A 108 may be temporarily limited (e.g., compared to cloud computing provider B 110). In some embodiments, cloud computing provider A 108 may implement a different set of one or more policies from other cloud computing providers. These policies may correspond to, for example, different limits on payload (e.g., batch) size, different request rates (e.g., a rate at which new batches of data records are received), etc. It should be understood that any suitable policies may be associated with a distributed environment.

In some embodiments, a remote function that is executed by an external computing device (e.g., a cloud computing provider) may perform any suitable data processing of data records. For example, in the case of data enrichment, representative cloud computing provider A 108 may receive a data record from computer system 101. In this example, the data record may contain a text field. The remote function may execute a machine learning model (and/or other suitable algorithm) to analyze the text field to determine, for example, a subject matter of the text field, information about the user who authored the text, etc. In another example, the remote function may analyze features of an image (and/or video) to determine characteristics of the image, such as an identity of a person in an image or other object recognition. It should be understood that any suitable types of data processing (e.g., and/or data enrichment) may be performed on data records via external invocations according to techniques described herein.

In some embodiments, there may be exist a plurality of parameters (e.g., many parameters) that may be associated with the computer system 101 (e.g., as a representative computer system) executing (e.g., invoking) an external invocation to call a remote function that executes external from the computer system 101 (e.g. executing by a particular cloud computing provider, such as cloud computing provider A 108). Techniques described herein may tune parameters to achieve efficient processing time for an external invocation of a remote function, while accommodating for the stochastic nature of cloud computing (e.g., variable network conditions, variable computing resource availability, various types of data records, etc.). For example, one type of parameter may correspond to a batch size (e.g., a number of data records of a batch of data records). For example, during a first time interval, network conditions (and/or computing resource availability) may be such that the computer system 101 may transmit a larger batch size (e.g., sixty data records each) that will be processed more efficiently than transmitting six batches of ten data records each. This may be due in part to avoiding initialization costs per batch. However, at a later time interval, during which time there may be less computing resources available (e.g., due to higher customer demand), the larger batch size may produce slower response times (e.g., slower data enrichment). This may be due, for example, to increased computing resources being allocated for garbage collection and/or process elimination, due in part to the higher batch size. In another example, a service provider may have a limit on the number of bits (e.g., bytes) that may be transmitted within a single batch, which limit may be adjusted at different times (e.g., unknown in advance to the computer system 101). In this example, a first time interval may allow for a batch to have up to 6 megabytes size, while a later time interval (that may (or may not) be known in advance) may allow for up to 1 megabyte size. Accordingly, while a larger batch byte size may be more efficient (e.g., optimal) during the earlier time interval, the optimal parameter value for this parameter may change (e.g., unpredictably) over time.

To further illustrate a technique for automatically tuning external invocations to account for the stochastic nature of cloud computing, and, using FIG. 1 for illustration, consider a scenario in which the computer system 101 intends to execute a plurality of external invocations that are collectively intended to enrich a plurality of data records. In this example, as described herein, the computer system 101 receives the plurality of data records (e.g., from the database 112), which may be a daily set of data records to be processed. In some embodiments, the computer system 101 may further determine one or more parameters 116 (e.g., a plurality of parameters) associated with executing external invocations for processing the plurality of data records. It should be understood that any suitable one or more parameters may be adjusted and/or affect performance (e.g., response time) when processing one or more samples of an external invocation. As indicated by parameters 116, this may include, for example, a parameter associated with a number of rows (e.g., a number of data records, corresponding to a batch size of a sample), a parameter associated with a time interval from when the last batch was transmitted (e.g., a time interval between a transmission of a first sample and a previous transmission of another sample of a particular external invocation), a number of bits (e.g., and/or bytes) associated with a sample, etc.

In this illustration, suppose that the computer system 101 determines to tune weights for parameter values for a particular parameter 118 (e.g., the batch size) of the plurality of parameters 116 over a series of external invocations involving a plurality of samples. Although, in this example, the auto-tuning involves adjustments to weights that are respectively associated with parameters values of the particular parameter 118, embodiments should not be construed to be so limited. For example, as described further herein, the auto-tuning may involve tuning weights (e.g., which may include multi-variate weights) of parameter values for other (e.g., additional) parameters of the plurality of parameters 116.

Continuing with the illustration, the computer system 101 may determine a plurality of parameter values 120 that are potential values of the particular parameter 118 (e.g., batch size). For example, as depicted in diagram 100, the plurality of parameter values 120 may include parameter value 122 (e.g., corresponding to ten data records, as a representative example), among other parameter values (e.g., twenty, thirty, forty, fifty, and sixty data records, as depicted in FIG. 1). In some embodiments, the plurality of parameter values for a given parameter of the plurality of parameters 116 may be a fixed, unique, and/or discrete set (e.g., a fixed population) for a given sequence of external invocations.

In some embodiments, the computer system 101 may further determine respective weights 124 of the parameter values 120. For example, as depicted in diagram 100, the weights 124 include weight 126 (e.g., 0.25, associated with the parameter value 122 of ten data records), another weight associated with the parameter value of twenty data records (e.g., 0.3), and so on. In some embodiments, the weights (e.g., which may be normalized) may add up to substantially 1.0. In some embodiments, described further below, a particular weight (e.g., weight 126) may be associated with a probability of selecting a batch (e.g., also referred to herein as a "sample") having the parameter value 122 associated with the particular weight. In some embodiments, initial weights (e.g., for an initial external invocation) may be set to a uniform probability distribution, as described further herein.

In some embodiments, the computer system 101 may determine a plurality of samples from the plurality of data records. In some embodiments, each sample may correspond to a batch that is associated with (and/or includes at least a portion of) one or more data records (e.g., rows). In some embodiments, each sample of the plurality of samples may be assigned to one of the plurality of parameter values 120.

For example, suppose that the number of the plurality of data records corresponds to 1000 data records. The computer system 101 may determine a first subset of batches that each have 10 data records each (e.g., corresponding to the parameter value 122 of ten data records). Using FIG. 1 for illustration, the first subset of batches may include representative batch A 128, which may be associated with parameter value 122 and include data record 114 (e.g., previously received the database 112) among the ten data records (e.g., rows) of the batch. In another example, a second subset of batches may be associated with the parameter value (e.g., batch size) of 20 data records, with batch B 130 corresponding to a representative batch of the second subset of batches. In yet another example, a third subset of batches may have fifty data records each (e.g., corresponding to another parameter value of the set of parameter values 120), with batch E 132 corresponding to a representative batch. In some embodiments, the total number of data records across all the batches may correspond to the plurality of data records that is intended for data enrichment. In some embodiments, the computer system 101 may determine the plurality of samples in advance (e.g., prior to executing a first invocation). In some embodiments, the computer system 101 may determine new samples over time, for example, based on feedback data determined from previous external invocations used to process other data records of the plurality of data records. In some embodiments, existing batches may be combined with other batches and/or otherwise re-constituted to form another batch size, depending in part on feedback data received from external invocations.

As described further herein, the computer system 101 may proceed to enrich the data records included within the plurality of samples by executing one or more external invocations, and tuning weights associated with parameters (e.g., parameter values) of each sample and/or external invocation based on feedback data determined from previous external invocations. For example, the computer system 101 may select a first sample (e.g., batch A 128 with parameter value 122, having ten data records) from the plurality of samples for processing via a first external invocation (e.g., invocation A 104). The selection of the first sample may be performed based on a first weight (e.g., weight 126) that is associated with the parameter value 122 of ten data records. As described further herein, it should be understood that a plurality of samples may be processed as part of an external invocation (which may be otherwise be referred to as an "iteration"). For example, as depicted in FIG. 1, the first external invocation (e.g., invocation A 104) may include at least batch A 128, batch B 130, and batch E 132. Although, in this case, each sample depicted has a different parameter value (e.g., batch size), it should be understood that any suitable combination of samples with respective parameter values may be selected for a given iteration, in accordance with a probability distribution indicated by the respective weights. For example, as described further herein (e.g., in reference to FIG. 2), the sampling may be performed with replacement (e.g., of population members, such as parameter values), whereby a given iteration may include multiple samples having the same (or different) respective batch sizes.

Continuing with the illustration, the computer system 101 may then execute the first external invocation via the network 106, thus invoking a remote function to be executed by a cloud computing provider (e.g., cloud computing provider A 108). The cloud computing provider may enrich the data records of the sample(s) of the first external invocation and then transmit a response message including the enriched data (and/or any other suitable response data). In some embodiments, a response message may be transmitted according to any suitable cadence. For example, a response message may be transmitted per enriched sample and/or per external invocation. In any case, the computer system 101 may determine feedback data associated with a level of performance of the first external invocation. This feedback data may be determined via any suitable method, including, for example, measuring response time intervals, receiving an indication of whether the sample was successfully processed or failed to receive any response, etc. Upon determining the feedback data, the computer system 101 may adjust weights 124 for the parameter values 120 of the parameter 118 (e.g., corresponding to batch size). Although, in FIG. 1, only the parameter values and weights for parameter 118 are depicted, it should be understood that the computer system 101 may be configured to determine adjusted weights for parameter values of multiple respective parameters. In some embodiments, a particular weight may be associated with multiple parameters (e.g., a multi-variate weight), and thus, the computer system 101 may be enabled to automatically tune selection of samples that are associated with a plurality of parameters. As described herein, although the weights for the parameter values 120 in this example (e.g., for this particular external invocation) have a non-uniform distribution, in some embodiments, the weights may be initially configured to a uniform probability distribution. This initial weightage may be used to select samples for an initial external invocation of the series of external invocations (e.g., before feedback data is determined and utilized for adjusting the weights).

Continuing with the illustration, the computer system 101 may then select one or more samples to be processed via execution of a second external invocation. In some embodiments, the number of samples selected between external invocations may be the same (or different) from other external invocations. In some embodiments, the selection of samples for the second external invocation may be based in part on the adjusted weights of the parameter values 120. Accordingly, a different set of samples with respective parameter values 120 (e.g., batch sizes) may be selected, whereby batch sizes associated with the higher weights may be selected more frequently. The computer system 101 may similarly proceed with invoking a sequence of external invocations (e.g., iterations), while efficiently tuning parameters following each iteration. In at least this way, techniques described herein may enable the computer system 101 to efficiently search for optimal parameter values from iteration to iteration, until the full plurality of data records has been processed (e.g., enriched).

Figure 2:
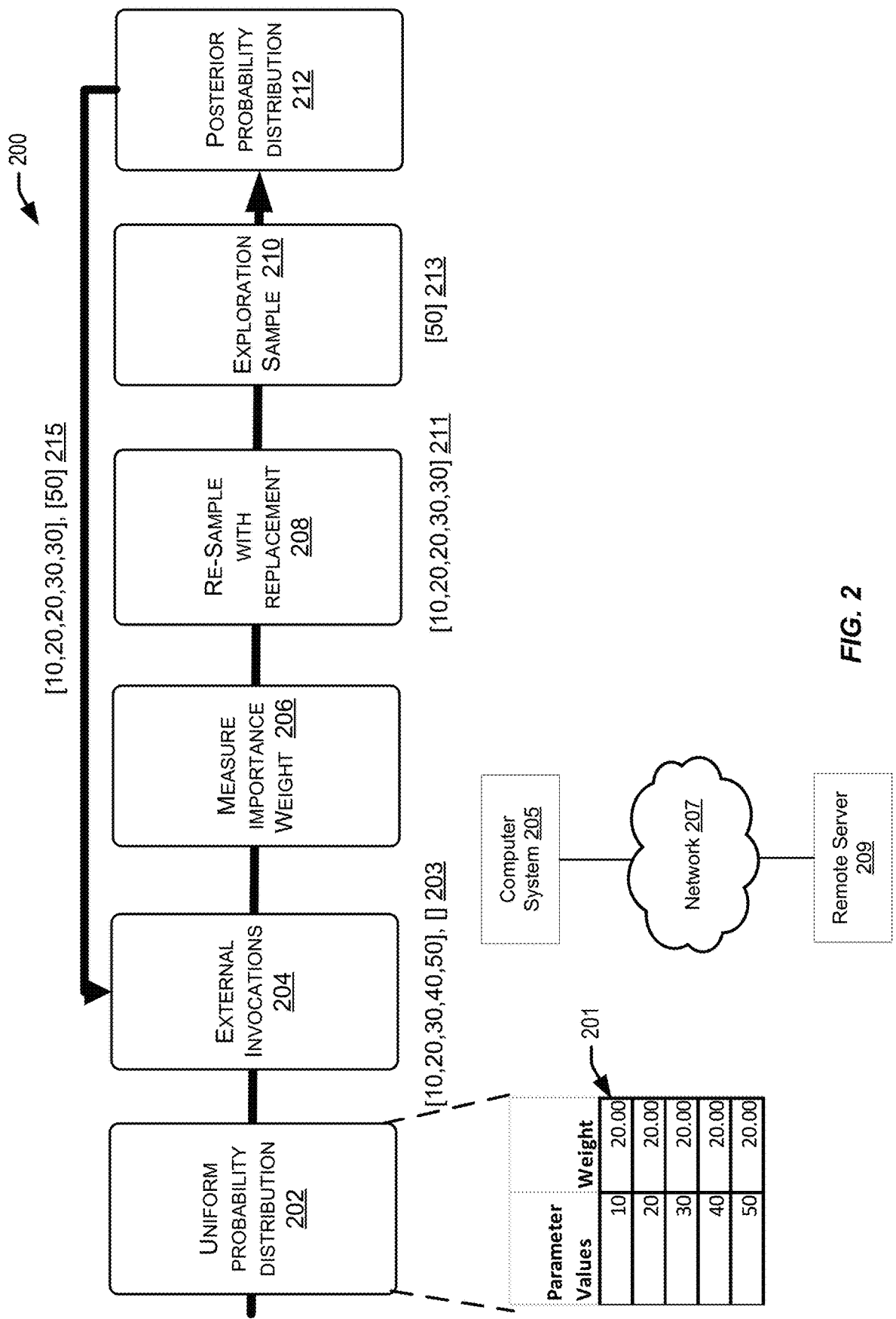
FIG. 2 is a simplified flow diagram illustrating an example technique for tuning external invocations utilizing weight-based parameter resampling, according to some embodiments.

FIG. 2 is a simplified flow diagram illustrating an example technique for tuning external invocations utilizing weight-based parameter resampling, according to some embodiments. The process 200 is an example high-level process for a system (e.g., computer system 205, which may be similar to computer system 101 of FIG. 1) that may tune one or more parameters over a sequence of external invocations. In some embodiments, the process 200 may be performed in the context of a distributed environment, similar to as described in reference to FIG. 1. FIG. 2 depicts example states that correspond to block of the process 200. Also, FIG. 2 includes elements that may be similar to those depicted in reference to FIG. 1. For example, table 201 may include a plurality of parameter values (e.g., similar to one or more parameter values of parameter values 120). Also, network 207 may be similar to network 106 and remote server 209 may be similar to a cloud computing provider (e.g., cloud computing provider A 108 or cloud computing provider B 110).

Turning to the process 200 in further detail, at block 202, the system (e.g., computer system 205) may determine an initial weights for a plurality of parameter values according to a uniform probability distribution. For example, using the elements of FIG. 2 for illustration, the system may initially receive a plurality of data records (e.g., from data store 102 of FIG. 1). In this example, the data records may be respectively intended for data enrichment (e.g., analyzing text in each data record to determine supplemental information (e.g., a subject matter) from the text). The system may determine to execute one or more of a sequence of external invocations to the remote server 209 (e.g., via the network 207). Each external invocation (e.g., iteration) may be associated with one or more batches (e.g., samples), whereby each sample includes a particular number of data records. As described herein, a remote function of the remote server 209 may be responsible for perform the data enrichment for each data record of each batch. The particular number of data records that is selected for a given sample may be expressed as a parameter value of a batch size parameter. In some embodiments, the system may generate a number of batches of various batch sizes in advance (e.g., partitioning the plurality of data records into various batches). In some embodiments, batches may be generated dynamically throughout process 200. As described herein, in some embodiments, the response time for processing a particular sample may be based at least in part on the particular batch size selected for a particular sample. Furthermore, the optimal batch size may vary over time, for example, as network conditions (e.g., of network 207) and/or computing resource availability (e.g., of remote server 209) change over time.

Continuing with block 202, the computer system 205 may not yet have invoked any external invocations over the plurality of data records, and thus, may not yet have determined feedback data (e.g., measurements) related to response times. Accordingly, because the computer system 205 does not yet possess information indicating which sample size is more likely to be processed with a shorter (e.g., more optimal) response time, the computer system 205 may determine at block 202 to determine initial weights for the plurality of parameter values of table 201 according to a uniform probability distribution. For example, as depicted in table 201, each of the population of parameter values (e.g., 10, 20, 30, 40, and 50) may be initially set to the same weight value (e.g., 20), whereby the population in this case is five members (e.g., five parameter values). In this example, as introduced above, each parameter value may correspond to a potential batch size for the batch size parameter. Accordingly, in some embodiments, for the initial external invocation, a probability of selecting a sample with a particular batch size (e.g., parameter value) may be the similar (e.g., the same) relative to other samples.

Figure 3:
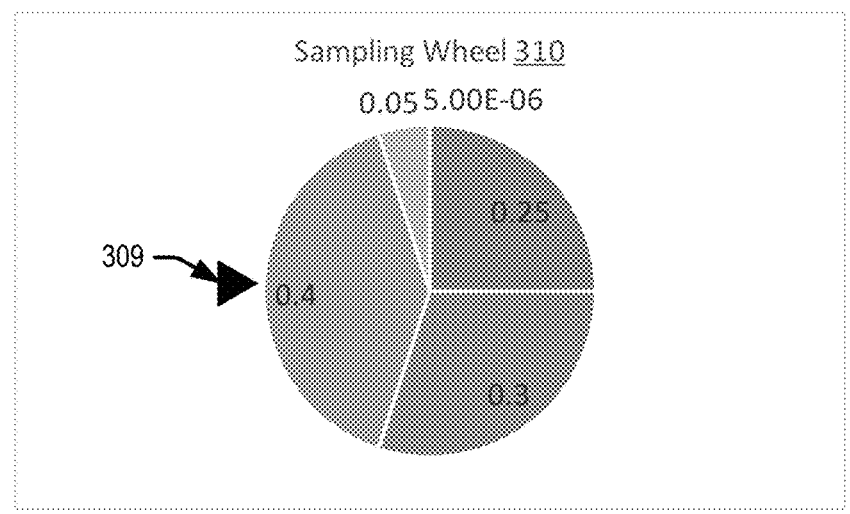
FIG. 3 is another simplified block diagram illustrating an example technique for tuning external invocations utilizing weight-based parameter resampling, according to some embodiments.
Figure 3:
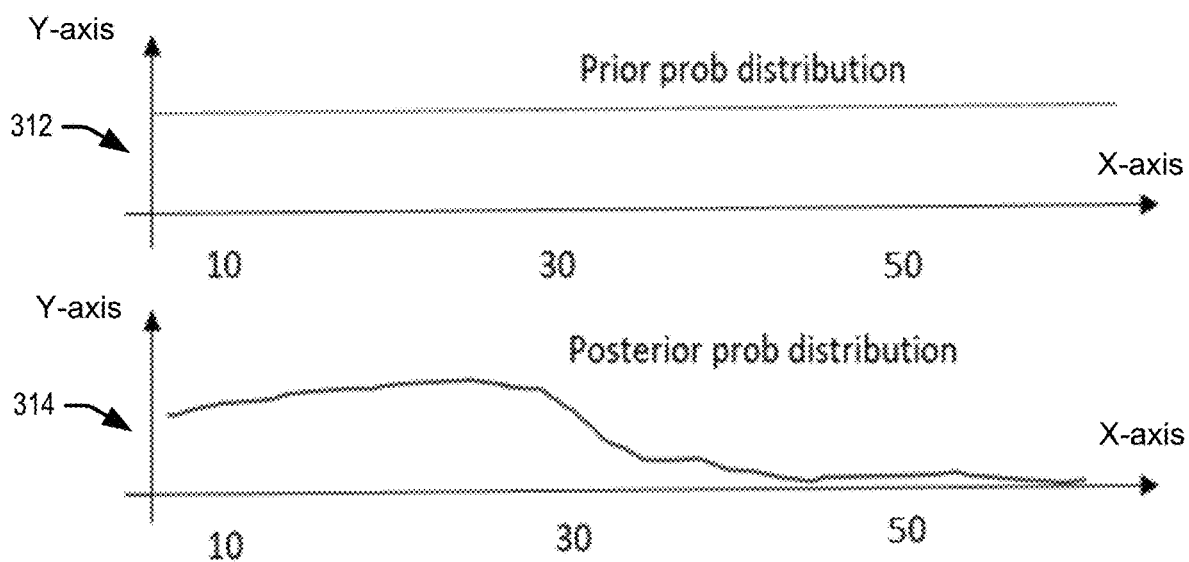

To further illustrate the uniform probability distribution associated with choosing a first set of samples for the initial external invocation, consider graph 312 of FIG. 3. Graph 312 depicts a prior probability distribution (e.g., prior to an external invocation, such as the initial external invocation) that corresponds, in this case, to a uniform probability distribution. For example, for each of the values (e.g., 10, 20, 30, 40, and 50) along the X-axis, there is a similar (e.g., same) probability of that parameter value (e.g., batch size) being selected, as reflected by plots along the Y-axis.

Continuing with the illustration of FIG. 2, at block 204, the system may invoke (e.g., execute) an external invocation. For example, upon determining the uniform probability distribution at block 202, the system may determine (e.g., generate) a plurality of samples from the plurality of data records, as described above. In one example, the system may partition the plurality of data records to generate a first number of batches each having a size of 10 data records (e.g., a first parameter value of the table 201), a second number of batches each having a size of 20 data records (e.g., a second parameter value of the table 201), and so forth, until a suitable number of batches of various sizes are generated (e.g., representative of the population of batch sizes). It should be understood that each sample may be assigned to one of the plurality of parameter values of table 201. The system may then select a first plurality of samples 203 (e.g., a subset of samples) from the plurality of samples, whereby the selection is performed according to the initial (e.g., uniform) probability distribution. In this example, the first plurality of samples 203 for the first external invocation includes a sample from each member of the population (e.g., a first sample with 10 data records, a second sample with 20 data records, and so forth). In this example, since it is the first external invocation, no exploration sample (described further herein) may be selected (e.g., represented by an empty brackets ("[ ]")), in part because each population member (e.g., sample size) already has representation within the first plurality of samples 203. In some embodiments, the number of batches (e.g., samples) included for an external invocation (e.g., the number of batches for the first plurality of samples 203) may be any suitable number. In this example, first plurality of samples 203 includes five batches, each of different batch sizes. In some embodiments, the number of batches included for an external invocation may be similar (e.g., the same) across multiple iterations.

Upon selecting the first plurality of samples 203 for the first external invocation, the computer system 205 may execute the first external invocation according to any suitable method. For example, the computer system 205 may invoke a remote function (e.g., executing on the remote server 209) via the network 207. In some embodiments, the computer system 205 may invoke the remote function in parallel, for example, requesting the remote function of the remote server 209 to process samples of the first plurality of samples in parallel. In some embodiments, this may enable the computer system 205 to conduct several measurements in parallel. This may further reduce the reaction time of recovery from faults (e.g., failures of the remote function to successfully return results) and/or recovery from slow response times. For example, as described further herein, the computer system 205 may more efficiently learn which population members (e.g., batch sizes) perform better most recently, and then adjust the weights for the respective parameter values accordingly for the next external invocation (e.g., involving a second plurality of samples). In some embodiments, the computer system 205 may execute the external invocation in any suitable manner. For example, the computer system 205 may invoke the remote function by inputting samples from the first plurality of samples in serial order. In some embodiments, as the remote server 209 receives and processes samples, the remote server 209 may return any suitable results (e.g., enriched data records, success/failure codes, etc.) to the computer system 205.

At block 206, the computer system may perform measurements to obtain feedback data, whereby the feedback data may be used to update weights of parameter values of the table 201. For example, continuing from block 204, for each of the samples of the first plurality of samples 203 of the first external invocation, the computer system 205 may determine if the respective sample was successfully processed (e.g., enriched) via the remote function, or if the remote function did not execute successfully. For example, the remote server 209 may transmit a response code (e.g., "Success" or "Failure") as feedback data, indicating a processing status for one or more data records of a particular sample. In another example, the computer system 205 may determine feedback data that corresponds to a time interval between invocation of a remote function for a particular sample and the time that a response (e.g., including a response code and/or enriched data records) is received from the remote server 209. This time interval may correspond to feedback data that is indicative of a response time for a particular invocation of a particular sample. Any suitable feedback data may be utilized to perform techniques described herein. In some embodiments, the computer system 205 may associate the feedback data for a particular sample with a particular parameter value associated with the particular sample. The computer system 205 may then update a weight corresponding to the particular parameter value based in part on the feedback data.

Using FIG. 3 for further illustration of the operations of block 206, the computer system may maintain (and/or update) a table 301. As depicted, table 301 includes four columns: a batch size column 302 (e.g., corresponding to discrete parameter values of the batch size parameter, as an example parameter), a response time column 304 (e.g., in seconds), a non-normalized importance weight column 306, and a normalized importance weight column 308. The columns of table 301 may reflect feedback data and associated updated weights for particular parameter values based on the respective feedback data. For example, as described above, suppose that the computer system 205 invokes each of the samples of the first plurality of samples 203 (of the first external invocation) in parallel. In this example, a first sample (with a batch size of ten data records) has a response time of five seconds, a second sample (with a batch size of twenty data records) has a response time of four seconds, a third sample (with a batch size of thirty data records) has a response time of three seconds, a fourth sample (with a batch size of forty data records) has a response time of ten seconds, and a fifth sample (with a batch size of fifty data records) is not successfully enriched. Each of these response times may correspond to a type of feedback (e.g., measurement) data that is received and/or observed by the computer system 205.

The computer system 205 may then update (e.g., adjust) the weights of the parameter values of table 201. For example, the computer system 205 may determine an updated weight (e.g., a non-normalized importance weight) for a particular parameter value based in part on the response time. In this example, the batch size of thirty data records has the lowest (e.g., best) response time of the parameter values, and therefore the non-normalized importance weight of the respective parameter value (e.g., a batch size of thirty data records) may be adjusted to 0.8 (e.g., the highest among the other parameter values). In another example, because the batch size of fifty data records did not return a successful result (e.g., returning a "Failure" code), the weight for column 306 may be reduced to a smaller weight ($1.0 \times 10^{-5}$). Accordingly, the weights for the other parameter values may be similarly adjusted. In some embodiments, a weight may be associated with an importance of a particular parameter value, whereby the importance is in accordance with the value (e.g., desirability) of the particular parameter value being selected. Thus, an adjusted weight that is increased from a previous value may reflect an increased importance of the associated parameter value. As described herein, this increased weight may correspond to an increased probability of subsequently selecting a sample associated with the particular parameter value. Likewise, an adjusted weight that is decreased from a previous value may reflect a decreased importance of that parameter value and/or a decreased probability of selecting a sample associated with the particular parameter value. In some embodiments, any suitable method (e.g., algorithm) may be used to determine a non-normalized importance weight. In one example, the non-normalized importance weight may be determined as a function of the previous response time, batch size, and/or other attributes of the batch. In some embodiments, upon determining the values for the non-normalized importance weight column 306, the computer system may determine normalized importance weights. In some embodiments, the normalized importance weights may be determined according to any suitable method (e.g., a Gaussian probability function). For example, as depicted in FIG. 3, the normalized importance weight column 308 may be determined such that the weights of the respective parameter values of column 302 may sum to substantially (e.g., approximately) 1.0.

Although the example described above depicts weights being adjusted based on feedback data that corresponds to response times (e.g., for enriched batch results being returned to the computer system 205), embodiments should not be construed to be so limited. For example, other feedback data may include whether the enriched data records are returned (e.g., from the remote server computer 209) in a single batch or across multiple batches. In another example, feedback data may correspond to which remote server (e.g., among a distributed cluster of servers) the enriched data is received from. In any case, the initial weights of table 201 may be adjusted according to any suitable feedback data. Furthermore, although FIG. 3 depicts both non-normalized weights and subsequently determined normalized weights (e.g., according to a Gaussian probability function), it should be understood that the adjusted weights may be determined according to any suitable fashion.

Continuing with the illustration of process 200 of FIG. 2, at block 208, the computer system 205 may perform re-sampling with replacement. Turning to back to FIG. 3 for illustrating the operations of block 208, the sampling wheel 310 may represent a mechanism for selecting samples (e.g., re-sampling) for executing a subsequent external invocation (e.g., a second external invocation). For example, as described above, table 301 may include updated weights for each of the parameter values (e.g., batch sizes) for the batch size parameter, and, in this example, the weights may be normalized (e.g., see column 308 of table 301). Accordingly, the sampling wheel 310 may reflect the normalized updated weights of column 308. In some embodiments, the sampling (e.g., and/or re-sampling) may be performed with replacement, as illustrated via the wheel 310. In some embodiments, a "spin" of the sampling wheel 310 may represent a selection event (e.g., a random selection) according to the updated weights of column 308, whereby the weights (e.g., portions/areas of the wheel 310) correspond to respective probabilities for selecting a particular parameter value of table 301. In this illustration, the portion (e.g., area) of the sampling wheel 310 that is adjacent to the marker 309 after the wheel spins (e.g., upon completion of the selection event) may be selected as the particular parameter value (e.g., the batch size) for a particular selection event. In some embodiments, the system may perform a number of selection events until the number of samples (e.g., five samples, similar to the initial iteration) for the next iteration (e.g., a second plurality of samples) has been selected. As depicted in FIG. 2, the second plurality of samples 211 includes five samples. It should be understood that, based in part on the updated weights from the operations of block 206, the parameter values for the samples selected for this next iteration may be different from the previous iteration. For example, the second plurality of samples 211 contains a first sample of ten data records, a second and third sample of twenty data records each, and a fourth and fifth sample of thirty data records each. It should be understood that the two samples of twenty data records each (and the two samples of thirty data records each) may be selected based in part on conducting the re-sampling process with replacement (e.g., being able to select the same parameter value more than one time for a given iteration). In at least this way, the system may determine which parameter values perform better from the previous iteration, and then optimize for selecting better-performing parameter values for the subsequent iteration. In some embodiments, the method of process 200 does not necessitate the system to learn (e.g., via machine learning) tuning parameters, nor to store learned parameters (e.g., over multiple iterations). For example, the system may not perform computations involving data from multiple iterations to tune the selection of parameters for a subsequent iteration. Instead, in some embodiments, the system may utilize the learned weights from the immediately previous iteration to be used in a subsequent iteration. In this way, techniques described herein may be performed more efficiently (e.g., less computing resources) and/or may better scale to handle multi-variate parameter tuning scenarios with more complexity.

At block 210, the system may select an exploration sample. In some embodiments, an exploration sample may optionally be selected, at least in part to ensure that the system continues to explore new optimal parameter values (e.g., avoiding being stationary in a local minima). In some embodiments, any suitable number and/or percentage of exploration samples may be selected. For example, in some embodiments, a fixed percentage of uniformly drawn random parameter values may be selected. In some embodiments, this fixed percentage may be included within (and/or in addition to) the second plurality of samples 211 as part of the second iteration (e.g., a second external invocation). For example, continuing with the above illustration, note that the second plurality of samples 211 does not contain any samples of batch size forty or fifty. This is due in part to the adjusted weights for the respective parameter values being significantly lowered, based on the feedback data from the initial iteration. Accordingly, if only the second plurality of samples 211 is transmitted during the second iteration, the system may not receive direct feedback data to indicate whether the parameter values of batch size forty and/or fifty have become more important since the previous iteration (and/or whether the weights for the respective parameter values should be readjusted (e.g., increased)). To mitigate the possibility of remaining stationary in a local minima, and enable the system to explore new optimal parameter values, the system may select one or more exploration samples. In the example of process 200, the system may select a number of exploration samples from the plurality of samples (e.g., generated at block 202) that is 20% of the population size (e.g., in this case, five parameter values). Accordingly, the system may select one exploration sample, which may correspond to exploration sample 213. In this example, exploration sample 213 has a batch size of fifty. In at least this way, the system may utilize the exploration sample(s) to explore new more optimal parameter values for each iteration.

Although the example of process 200 involves selecting exploration samples based on a fixed percentage of uniformly drawn parameter values, embodiments should not be construed to be so limited. For example, instead of selecting a fixed percentage of parameter values of a population, the percentage of parameter values may be adjusted between iterations. For example, if a particular parameter value has a large weight that exceeds a particular threshold (e.g., potentially crowding out other parameter values from being explored), the system may increase the percentage of parameter values selected for a subsequent iteration (e.g., as a percentage of the population). In another example, the system may determine to select only parameter values that are not already represented within a particular iteration's plurality of samples. It should be understood that any suitable method may be used to determine which samples and/or how many samples will be selected as exploration samples.

Continuing with process 200, at block 212, upon the completion of re-sampling (e.g., with replacement), the system may determine a posterior probability distribution. In some embodiments, the posterior probability distribution may be in accordance with (and/or reflective of) the updated normalized importance weights of column 308 of table 301 that were used to select the new plurality of samples for the next iteration. For example, upon selecting the second plurality of samples 211 at block 208, the posterior probability distribution of selected samples may be determined, as reflected by graph 314 of FIG. 3. In graph 314, the posterior probability distribution reflects that samples with batch sizes ten, twenty, and thirty were selected, while batch sizes forty and fifty were not selected (e.g., as part of the second plurality of samples 211). In some embodiments, the posterior probability distribution may (or may not) incorporate the zero or more exploration samples (e.g., exploration sample 213) that are included within a particular iteration. In some embodiments, the posterior probability distribution may be used as an input to determine subsequently adjusted weights. In some embodiments, the posterior probability distribution may be optionally determined, for example, for auditing purposes.

The system may then repeat steps of the process 200 to execute a sequence of one or more subsequent iterations, until the total plurality of data records is processed (e.g., enriched). For example, as depicted in FIG. 2, the computer system 205 may execute the second iteration at block 204 (e.g., repeating one or more operations of block 204), this time invoking the remote function of the remote server 209 to process the second plurality of samples 211 and the exploration sample 213 (e.g., which collectively represent samples 215 included in the second iteration). The computer system 205 may then repeat the measurement, re-sampling, and/or invocation steps over one or more iterations. For each iteration, the computer system 205 may update (e.g., tune) weights for parameter values based on measurements from the previous iteration. In this way, the system 205 may continuously adapt to changing conditions (e.g., changing network conditions, changing computing resource availability, and/or changing policies).

Although the illustration of FIG. 2 involves tuning a particular parameter (e.g., batch size), embodiments should not be construed to be so limited. For example, as described in reference to FIG. 1, in another example, a plurality of parameters may respectively have parameter values that may be tunable (e.g., via adjustable weights). In some embodiments, the system may maintain multi-dimensional weights, respectively, associated with a particular combination of parameter values across multiple parameters. For example, a multi-dimensional weight may be represented by a vector of values, whereby each value of the vector corresponds to a particular parameter value of a different tunable parameter. The system may adjust one or more values of the weight vector (e.g., across multiple vectors) for each iteration. Accordingly, the system may then select samples based at least in part on adjusted multi-variate weight vectors per iteration.

FIG. 4 is another simplified block diagram illustrating an example technique for tuning external invocations utilizing weight-based parameter resampling, according to some embodiments. In this illustration of FIG. 4, table 400 depicts a sequence of external invocations (e.g., iterations) that are executed to process a plurality of data records. Each iteration cycle may correspond to a series of one or more operations that are similar to process 200 of FIG. 2. In the example of FIG. 4, the computer system (e.g., computer system 101 of FIG. 1, and/or computer system 205 of FIG. 2) may be tasked with enriching 1,000 data records (e.g., received from data store 102) via invoking the sequence of external invocations. In this example, similar to the illustrations of FIGS. 2 and 3, a single parameter (e.g., batch size) is repeatedly automatically tuned over the course of the sequence of iterations. Also, in this example, the population of potential parameter values for the batch size parameter has five members (e.g., a batch size of 10, 20, 30, 40, or 50). As described in reference to FIG. 2, in some embodiments, the computer system may partition the plurality of 1,000 data records into a plurality of samples (e.g., batches of various batch sizes, the batch size for each batch being one of the population of batch sizes). For example, some batches may have a size of 10 data records, 20 data records, and so on. In this illustration, the number of exploration samples selected for each iteration, following the initial external invocation, may be set to 20% of the population (e.g., one sample). Table 400 includes column 402 (e.g., identifying each iteration in the sequence), column 404 (e.g., identifying a plurality of samples (e.g., including exploration samples) for each iteration), and column 406 (e.g., identifying a total number of data records (e.g., rows) enriched per iteration).

Turning to the sequence of external invocations of table 400 in further detail, the computer system may execute an initial iteration 408 to invoke an initial external invocation. For example, similar to as described in reference to block 202 of FIG. 2, the computer system may first determine a uniform probability distribution of weights for batch size parameter values. For this illustration, the system determines that the number of the plurality of sample sizes (e.g., apart from potential exploration samples) to be executed per iteration is five. For example, a plurality of sample sizes selected for first external invocation includes 10, 20, 30, 40, and 50, which is in accordance with the uniform probability distribution. For the initial iteration, there are no exploration samples included. In some embodiments, this may be due in part to each population member already having representation within the plurality of sample sizes. In some embodiments, an exploration sample may be selected for the initial iteration. Continuing with the initial iteration 408, a remote server (e.g., remote server 209) may process each of the batch sizes and return the enriched data records to the computer system (e.g., 150 rows processed total, as reflected via column 406). The computer system may measure feedback data for each sample (e.g., each sample size) processed. In this example, the system may determine that the batch size of 10 data records is associated with the fastest response times. The system then adjust weights for batch size parameter values, as described herein. For example, the weight for the "10 data records" parameter value may be increased, relative to other population members.

Accordingly, the computer system may re-sample with replacement according to the updated weights. In this example, as reflected via column 404 for iteration 410 (e.g., the second iteration), the system may select a second plurality of five samples: three samples have a batch size of 10 data records, and two samples have a batch size of 40 data records. These selections may reflect a posterior probability distribution in accordance with the weight of the 10 (and 40) data records batch size having increased, relative to other weights. Since the second plurality of samples does not include representation from the other batch sizes, the system may select an exploration sample (e.g., from other batch sizes of the population of potential batch sizes). In this case, the system selects a batch size of 20 for the exploration sample. The system then executes the second iteration 410 (e.g., the second external invocation) that includes both the second plurality of samples and the exploration sample, for a total enrichment of 130 data records (e.g., of the original 1,000 data records that require enrichment).

In some embodiments, the computer system may proceed similarly for the third iteration 412 and fourth iteration 414. Note that, for each of those iterations, a different (e.g., random) exploration sample may be selected (e.g., 30 (for iteration 412) and 40 (for iteration 414)), for example, according to a uniform probability distribution. In this way, the system may ensure that parameter values that may have lower weights (e.g., due to previous slower response times) may still be explored as potential values that deserve renewed importance for a subsequent iteration (e.g., due to a change in network conditions, remote server policy, computing resource availability, etc.). At the end of the fourth iteration 414, the computer system detects, based on feedback data from the exploration sample, that the batch size of 40 data records is now performing fastest, and increases the associated weight accordingly. Thus, for the fifth iteration 416, three samples are included that each have a batch size of 40 data records. As depicted via table 400, the batch size for 40 records continues to perform well for the sixth iteration 418 and the seventh iteration 420, with the more samples being selected, having 40 data records (e.g., for each iteration). For the eighth (e.g., final) iteration 422, the system may transmit the last remaining data records of the 1,000 total data records to be processed. For example, the computer system may perform re-sampling with replacement, following the seventh iteration 420 to determine new sample sizes (e.g., 40, 40, 40, 40, and 40), with an exploration sample size of 10. However, there may only be 20 data records left to process. Accordingly, the system may transmit the last 20 data records in any suitable fashion (e.g., a batch size of 20 data records, two batches of 10 data records, etc.).

Similar to as described in reference to FIGS. 2 and 3, FIG. 4 describes optimizing a single parameter value corresponding to batch size. However, embodiments should not be construed to be so limited. For example, multiple parameters may be tuned over each iteration, including, but not limited to, batch size, latency (e.g., between sample invocations), bit/byte size of a data record, etc. It should also be understood that, utilizing the techniques described herein, the system may automatically tune parameter values for one or more parameters for each new iteration, thus quickly adapting to changing conditions, while remaining resource efficient when determining how to tune the parameters.

Figure 5:
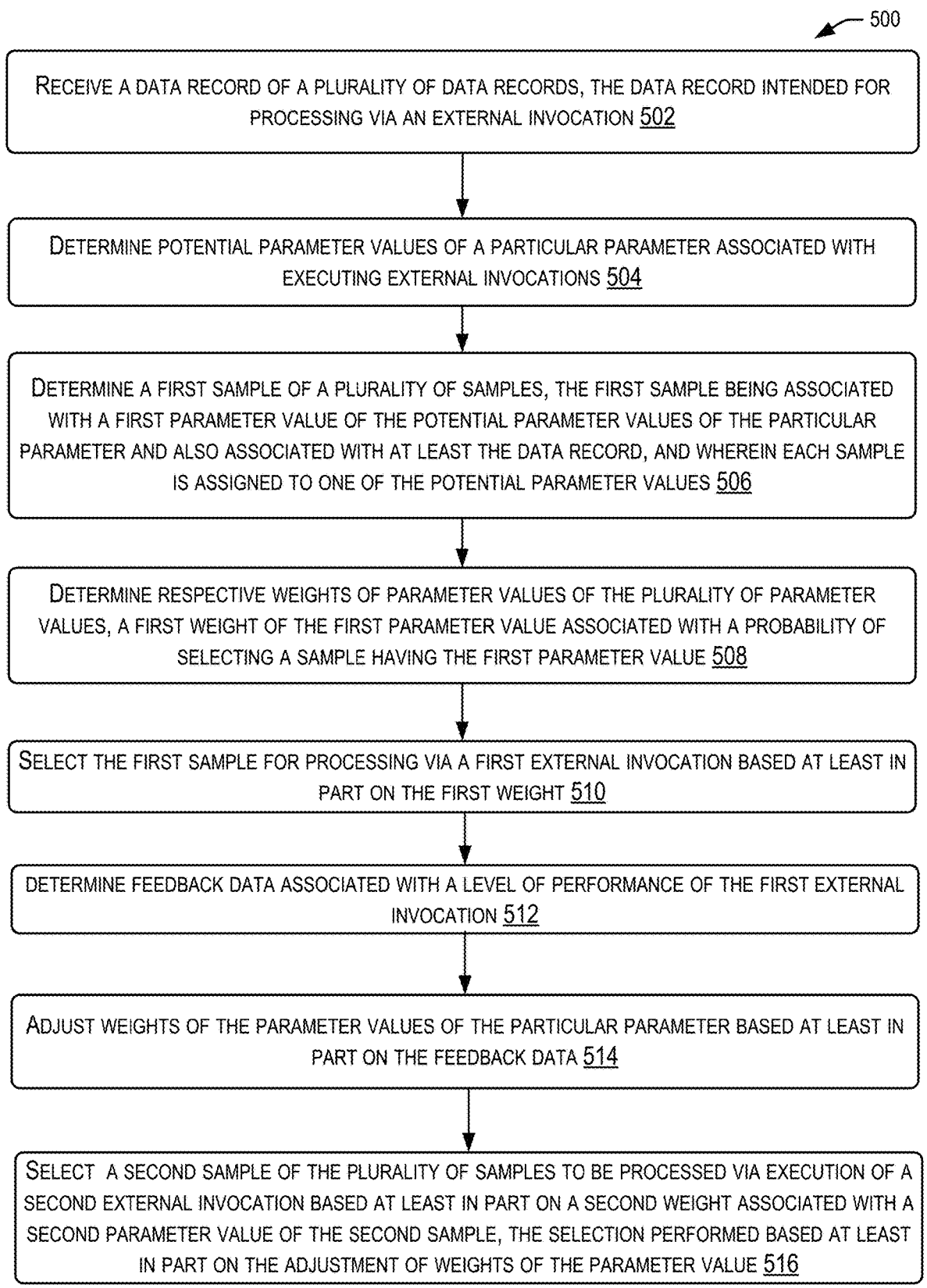
FIG. 5 is another simplified flow diagram illustrating an example process for tuning external invocations utilizing weight-based parameter resampling, according to some embodiments.

FIG. 5 is another simplified flow diagram illustrating an example process for tuning external invocations utilizing weight-based parameter resampling, according to some embodiments. In some embodiments, process 500 of FIG. 5 may be performed be any suitable computer system (e.g., computer system 101 of FIG. 1).

Process 500 is respectively illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

At block 502, a computer system may receive a data record of a plurality of data records intended for processing via an external invocation. In some embodiments, the data record may correspond to any suitable data record (e.g., a user input, such as a text message, a blog post, a video, an audio recording, an image, etc.). In some embodiments, the data record may be processed in any suitable way, including, but not limited to, data enrichment that involves determining supplementary information from the data record. In some embodiments, the external invocation may involve invoking a remote function of a computer system executing within a distributed environment (e.g., in the cloud).

At block 504, the computer system may determine potential parameter values of a particular parameter associated with executing external invocations. In some embodiments, the particular parameter correspond to any suitable tunable parameter, whereby adjustments of the particular parameter may be associated with a success rate and/or rate of efficiency (e.g., response time) when invoking the remote function to process the data record. In one example, the particular parameter may correspond to a batch size of a batch of user inputs (e.g., a batch of text messages). The batch size may indicate a number of a subset of the plurality of data records that corresponds to the batch. In some embodiments, the plurality of parameter values may be a discrete and/or unique set of potential values for the particular parameter (e.g., different batch sizes). In some embodiments, the plurality of parameter values may be fixed (e.g., a fixed population size) between external invocations used to process the plurality of data records. In some embodiments, one or more operations of block 504 may be similar to block 202 of FIG. 2. In some embodiments, the particular parameter may be one of a plurality of parameters, for example, associated with a number of data records of a sample a time interval between transmission of samples of an external invocation, a number of bits associated with a sample, and/or any suitable type of parameter.

At block 506, the computer system may determine a first sample of a plurality of samples. In some embodiments, the first sample includes at least the data record and corresponds to a particular batch of user inputs intended for data enrichment. In some embodiments, the first sample is associated with a first parameter value of the potential values of the particular parameter, whereby each sample of the plurality of samples is assigned to one of the plurality of parameter values. In some embodiments, the plurality of samples may be generated from the plurality of data records, for example, by grouping subsets of data records into different samples, whereby each sample may have a particular batch size that is one of the plurality of parameter values. In some embodiments, one or more operations of block 506 may be similar to block 202 and/or block 204 of FIG. 2.

At block 508, the computer system may determine respective weights of parameter values of the plurality of parameter values. In some embodiments, a first weight of the first parameter value may be associated with a probability of selecting a sample having the first parameter value (e.g., a particular batch size). In some embodiments, one or more operations of block 508 may be similar to as described in reference to FIGS. 2 and 3 (e.g. related to determining weights of parameter values). In some embodiments, for example, in a case where there are multiple parameters, a weight (e.g., a weight vector) may be associated with multiple parameters (e.g., a particular combination of parameter values), as described herein.

At block 510, the computer system may select the first sample for processing via a first external invocation of the external invocations based at least in part on the first weight. In some embodiments, the first sample may be one of a first plurality of samples that is a subset of the plurality of samples. For example, the first plurality of samples may include the first sample and a second sample. In some embodiments, the selection of samples for inclusion among the first plurality of samples is performed with replacement. For example, in some embodiments, the second sample is also associated with the first parameter value of the population of parameter values of the particular parameter. In some embodiments, the first external invocation corresponds to an initial external invocation that is used to process a first portion of the plurality of data records. In this case, the respective weights may be determined according to a uniform probability distribution.

At block 512, the computer system may determine feedback data associated with a level of performance of the first external invocation. In some embodiments, the level of performance is associated with a response time interval between transmission of the first sample to a server computer (e.g., for invoking a remote function) and receipt of a response to the transmission that includes enriched data from the server computer. In some embodiments, one or more operations of block 512 may be similar to as described in reference to FIGS. 2 and 3 (e.g. block 206 of FIG. 2). In some embodiments, the requests (e.g., invocations) for processing samples of the first external invocation may be transmitted in parallel to the server computer that is configured to process requests in parallel. In some embodiments, being able to invoke parallel requests and conduct measurements in parallel may decrease the reaction time of recovery from faults (e.g., if a sample fails to be processed) and/or quickly improve processing times for subsequent iterations. In some embodiments, the samples may be transmitted and processed serially.

At block 514, the computer system may adjust weights of the parameter values of the particular parameter based at least in part on the feedback data. In some embodiments, one or more operations of block 514 may be similar to as described in reference to FIGS. 2 and 3 (e.g. block 206 of FIG. 2). For example, the computer system may measure response times for samples of different batch sizes, and then adjust the weights based on response times.

At block 516, the computer system may select a second sample of the plurality of samples to be processed via execution of a second external invocation. In some embodiments, the second sample may be selected based at least in part on a second weight associated with a second parameter value of the second sample, whereby the selection is performed based in part on the adjustment of weights of the parameter values. In some embodiments, similar to as described above, the second sample may be one of a second plurality of samples of the plurality of samples. In some embodiments, the system may optionally select one or more additional samples (e.g., exploratory samples), whereby both the second plurality of samples and the one or more additional samples are processed via the second external invocation. In some embodiments, the number of the one or more additional samples may be determined as a percentage (e.g., a fixed percentage) of the population size (e.g., the number of parameter values). In some embodiments, the additional samples may be selected independently from respective weights of parameter values of the plurality of parameter values. For example, the exploratory samples may be selected based on a uniform probability distribution instead of adjusted weights.

In some embodiments, as described herein, the system may execute the sequence of iterations (e.g., the first external invocation, the second external invocation, and so on) to process the full plurality of data records. In some embodiments the system may continuously tune parameters per iteration, based on measurements from the previous iteration. In at least this way, techniques described herein enable the system to quickly adjust to changing conditions (e.g., recovery from outages and/or slower processing times), reduce system complexity (e.g., simplifying the parameter tuning process), and efficiently scale to solve multi-variate parameter tuning problems.

The term cloud service is generally used to refer to a service that is made available by a cloud services provider (CSP) to users or customers on demand (e.g., via a subscription model) using systems and infrastructure (cloud infrastructure) provided by the CSP. Typically, the servers and systems that make up the CSP's infrastructure are separate from the customer's own on-premise servers and systems. Customers can thus avail themselves of cloud services provided by the CSP without having to purchase separate hardware and software resources for the services. Cloud services are designed to provide a subscribing customer easy, scalable access to applications and computing resources without the customer having to invest in procuring the infrastructure that is used for providing the services.

There are several cloud service providers that offer various types of cloud services. There are various different types or models of cloud services including Software-as-a-Service (SaaS), Platform-as-a-Service (PaaS), Infrastructure-as-a-Service (IaaS), and others.

A customer can subscribe to one or more cloud services provided by a CSP. The customer can be any entity such as an individual, an organization, an enterprise, and the like. When a customer subscribes to or registers for a service provided by a CSP, a tenancy or an account is created for that customer. The customer can then, via this account, access the subscribed-to one or more cloud resources associated with the account.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 6:
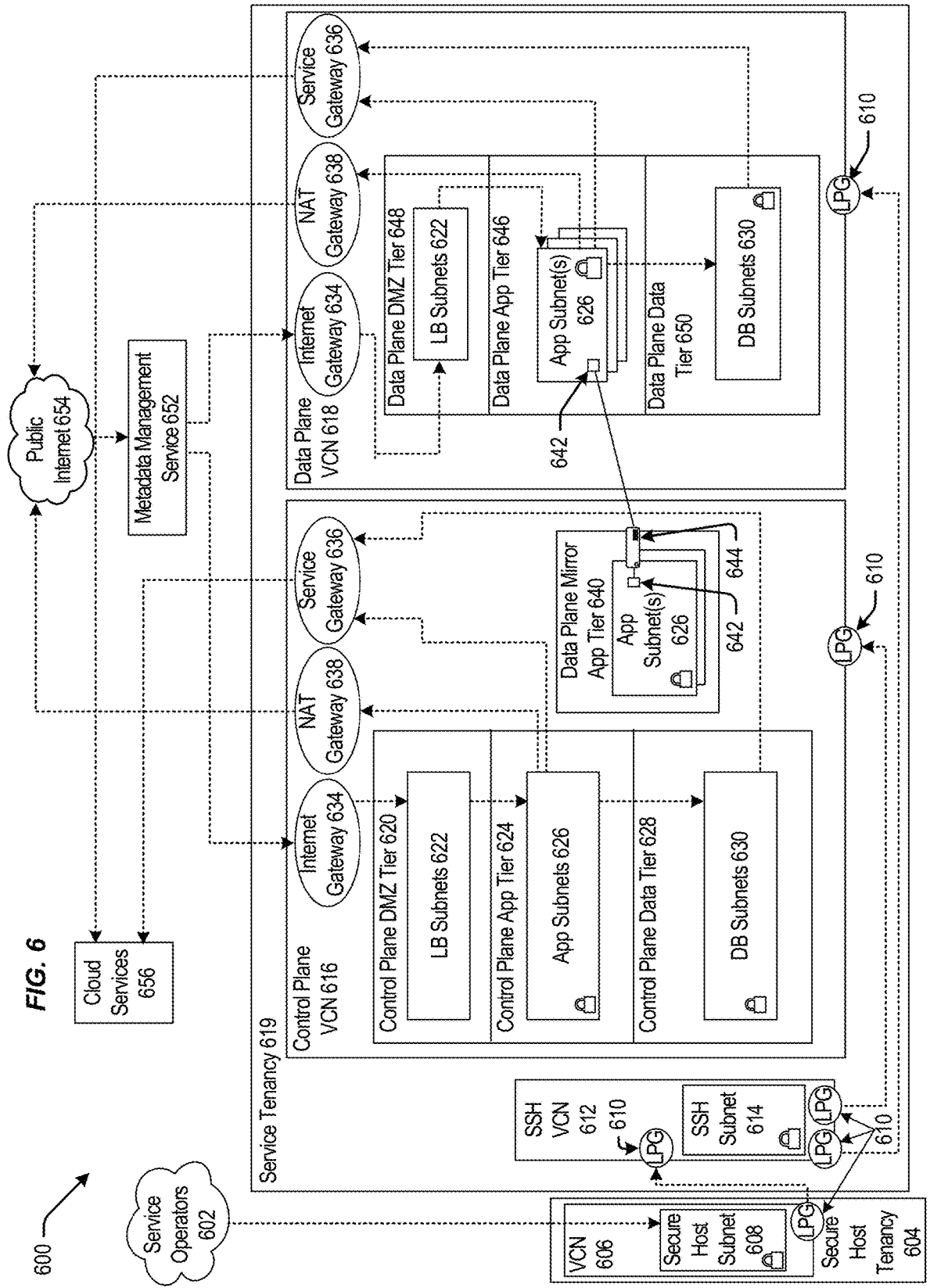
FIG. 6 is a block diagram illustrating one pattern for implementing a cloud infrastructure as a service system, according to at least one embodiment.

FIG. 6 is a block diagram 600 illustrating an example pattern of an IaaS architecture, according to at least one embodiment. Service operators 602 can be communicatively coupled to a secure host tenancy 604 that can include a virtual cloud network (VCN) 606 and a secure host subnet 608. In some examples, the service operators 602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service, Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 606 and/or the Internet.

The VCN 606 can include a local peering gateway (LPG) 610 that can be communicatively coupled to a secure shell (SSH) VCN 612 via an LPG 610 contained in the SSH VCN 612. The SSH VCN 612 can include an SSH subnet 614, and the SSH VCN 612 can be communicatively coupled to a control plane VCN 616 via the LPG 610 contained in the control plane VCN 616. Also, the SSH VCN 612 can be communicatively coupled to a data plane VCN 618 via an LPG 610. The control plane VCN 616 and the data plane VCN 618 can be contained in a service tenancy 619 that can be owned and/or operated by the IaaS provider.

The control plane VCN 616 can include a control plane demilitarized zone (DMZ) tier 620 that acts as a perimeter network (e.g., portions of a corporate network between the corporate intranet and external networks). The DMZ-based servers may have restricted responsibilities and help keep breaches contained. Additionally, the DMZ tier 620 can include one or more load balancer (LB) subnet(s) 622, a control plane app tier 624 that can include app subnet(s) 626, a control plane data tier 628 that can include database (DB) subnet(s) 630 (e.g., frontend DB subnet(s) and/or backend DB subnet(s)). The LB subnet(s) 622 contained in the control plane DMZ tier 620 can be communicatively coupled to the app subnet(s) 626 contained in the control plane app tier 624 and an Internet gateway 634 that can be contained in the control plane VCN 616, and the app subnet(s) 626 can be communicatively coupled to the DB subnet(s) 630 contained in the control plane data tier 628 and a service gateway 636 and a network address translation (NAT) gateway 638. The control plane VCN 616 can include the service gateway 636 and the NAT gateway 638.

The control plane VCN 616 can include a data plane mirror app tier 640 that can include app subnet(s) 626. The app subnet(s) 626 contained in the data plane mirror app tier 640 can include a virtual network interface controller (VNIC) 642 that can execute a compute instance 644. The compute instance 644 can communicatively couple the app subnet(s) 626 of the data plane mirror app tier 640 to app subnet(s) 626 that can be contained in a data plane app tier 646.

The data plane VCN 618 can include the data plane app tier 646, a data plane DMZ tier 648, and a data plane data tier 650. The data plane DMZ tier 648 can include LB subnet(s) 622 that can be communicatively coupled to the app subnet(s) 626 of the data plane app tier 646 and the Internet gateway 634 of the data plane VCN 618. The app subnet(s) 626 can be communicatively coupled to the service gateway 636 of the data plane VCN 618 and the NAT gateway 638 of the data plane VCN 618. The data plane data tier 650 can also include the DB subnet(s) 630 that can be communicatively coupled to the app subnet(s) 626 of the data plane app tier 646.

The Internet gateway 634 of the control plane VCN 616 and of the data plane VCN 618 can be communicatively coupled to a metadata management service 652 that can be communicatively coupled to public Internet 654. Public Internet 654 can be communicatively coupled to the NAT gateway 638 of the control plane VCN 616 and of the data plane VCN 618. The service gateway 636 of the control plane VCN 616 and of the data plane VCN 618 can be communicatively couple to cloud services 656.

In some examples, the service gateway 636 of the control plane VCN 616 or of the data plane VCN 618 can make application programming interface (API) calls to cloud services 656 without going through public Internet 654. The API calls to cloud services 656 from the service gateway 636 can be one-way: the service gateway 636 can make API calls to cloud services 656, and cloud services 656 can send requested data to the service gateway 636. But, cloud services 656 may not initiate API calls to the service gateway 636.

In some examples, the secure host tenancy 604 can be directly connected to the service tenancy 619, which may be otherwise isolated. The secure host subnet 608 can communicate with the SSH subnet 614 through an LPG 610 that may enable two-way communication over an otherwise isolated system. Connecting the secure host subnet 608 to the SSH subnet 614 may give the secure host subnet 608 access to other entities within the service tenancy 619.

The control plane VCN 616 may allow users of the service tenancy 619 to set up or otherwise provision desired resources. Desired resources provisioned in the control plane VCN 616 may be deployed or otherwise used in the data plane VCN 618. In some examples, the control plane VCN 616 can be isolated from the data plane VCN 618, and the data plane mirror app tier 640 of the control plane VCN 616 can communicate with the data plane app tier 646 of the data plane VCN 618 via VNICs 642 that can be contained in the data plane mirror app tier 640 and the data plane app tier 646.

In some examples, users of the system, or customers, can make requests, for example create, read, update, or delete (CRUD) operations, through public Internet 654 that can communicate the requests to the metadata management service 652. The metadata management service 652 can communicate the request to the control plane VCN 616 through the Internet gateway 634. The request can be received by the LB subnet(s) 622 contained in the control plane DMZ tier 620. The LB subnet(s) 622 may determine that the request is valid, and in response to this determination, the LB subnet(s) 622 can transmit the request to app subnet(s) 626 contained in the control plane app tier 624. If the request is validated and requires a call to public Internet 654, the call to public Internet 654 may be transmitted to the NAT gateway 638 that can make the call to public Internet 654. Memory that may be desired to be stored by the request can be stored in the DB subnet(s) 630.

In some examples, the data plane mirror app tier 640 can facilitate direct communication between the control plane VCN 616 and the data plane VCN 618. For example, changes, updates, or other suitable modifications to configuration may be desired to be applied to the resources contained in the data plane VCN 618. Via a VNIC 642, the control plane VCN 616 can directly communicate with, and can thereby execute the changes, updates, or other suitable modifications to configuration to, resources contained in the data plane VCN 618.

In some embodiments, the control plane VCN 616 and the data plane VCN 618 can be contained in the service tenancy 619. In this case, the user, or the customer, of the system may not own or operate either the control plane VCN 616 or the data plane VCN 618. Instead, the IaaS provider may own or operate the control plane VCN 616 and the data plane VCN 618, both of which may be contained in the service tenancy 619. This embodiment can enable isolation of networks that may prevent users or customers from interacting with other users', or other customers', resources. Also, this embodiment may allow users or customers of the system to store databases privately without needing to rely on public Internet 654, which may not have a desired level of threat prevention, for storage.

In other embodiments, the LB subnet(s) 622 contained in the control plane VCN 616 can be configured to receive a signal from the service gateway 636. In this embodiment, the control plane VCN 616 and the data plane VCN 618 may be configured to be called by a customer of the IaaS provider without calling public Internet 654. Customers of the IaaS provider may desire this embodiment since database(s) that the customers use may be controlled by the IaaS provider and may be stored on the service tenancy 619, which may be isolated from public Internet 654.

Figure 7:
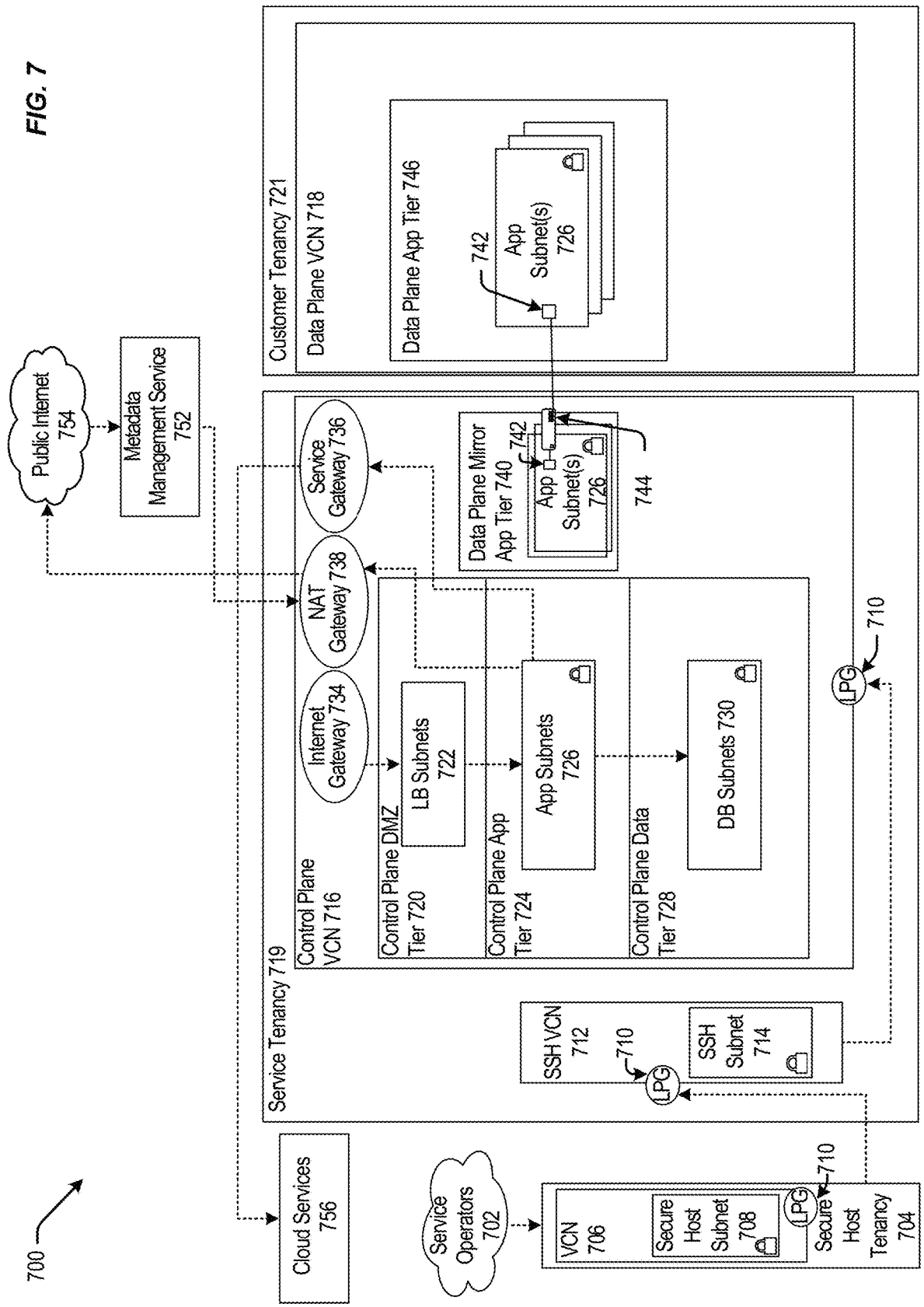
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g. service operators 602 of FIG. 6) can be communicatively coupled to a secure host tenancy 704 (e.g. the secure host tenancy 604 of FIG. 6) that can include a virtual cloud network (VCN) 706 (e.g. the VCN 606 of FIG. 6) and a secure host subnet 708 (e.g. the secure host subnet 608 of FIG. 6). The VCN 706 can include a local peering gateway (LPG) 710 (e.g. the LPG 610 of FIG. 6) that can be communicatively coupled to a secure shell (SSH) VCN 712 (e.g. the SSH VCN 612 of FIG. 6) via an LPG 610 contained in the SSH VCN 712. The SSH VCN 712 can include an SSH subnet 714 (e.g. the SSH subnet 614 of FIG. 6), and the SSH VCN 712 can be communicatively coupled to a control plane VCN 716 (e.g. the control plane VCN 616 of FIG. 6) via an LPG 710 contained in the control plane VCN 716. The control plane VCN 716 can be contained in a service tenancy 719 (e.g. the service tenancy 619 of FIG. 6), and the data plane VCN 718 (e.g. the data plane VCN 618 of FIG. 6) can be contained in a customer tenancy 721 that may be owned or operated by users, or customers, of the system.

The control plane VCN 716 can include a control plane DMZ tier 720 (e.g. the control plane DMZ tier 620 of FIG. 6) that can include LB subnet(s) 722 (e.g. LB subnet(s) 622 of FIG. 6), a control plane app tier 724 (e.g. the control plane app tier 624 of FIG. 6) that can include app subnet(s) 726 (e.g. app subnet(s) 626 of FIG. 6), a control plane data tier 728 (e.g. the control plane data tier 628 of FIG. 6) that can include database (DB) subnet(s) 730 (e.g. similar to DB subnet(s) 630 of FIG. 6). The LB subnet(s) 722 contained in the control plane DMZ tier 720 can be communicatively coupled to the app subnet(s) 726 contained in the control plane app tier 724 and an Internet gateway 734 (e.g. the Internet gateway 634 of FIG. 6) that can be contained in the control plane VCN 716, and the app subnet(s) 726 can be communicatively coupled to the DB subnet(s) 730 contained in the control plane data tier 728 and a service gateway 736 (e.g. the service gateway of FIG. 6) and a network address translation (NAT) gateway 738 (e.g. the NAT gateway 638 of FIG. 6). The control plane VCN 716 can include the service gateway 736 and the NAT gateway 738.

The control plane VCN 716 can include a data plane mirror app tier 740 (e.g. the data plane mirror app tier 640 of FIG. 6) that can include app subnet(s) 726. The app subnet(s) 726 contained in the data plane mirror app tier 740 can include a virtual network interface controller (VNIC) 742 (e.g. the VNIC of 642) that can execute a compute instance 744 (e.g. similar to the compute instance 644 of FIG. 6). The compute instance 744 can facilitate communication between the app subnet(s) 726 of the data plane mirror app tier 740 and the app subnet(s) 726 that can be contained in a data plane app tier 746 (e.g. the data plane app tier 646 of FIG. 6) via the VNIC 742 contained in the data plane mirror app tier 740 and the VNIC 742 contained in the data plane app tier 746.

The Internet gateway 734 contained in the control plane VCN 716 can be communicatively coupled to a metadata management service 752 (e.g. the metadata management service 652 of FIG. 6) that can be communicatively coupled to public Internet 754 (e.g. public Internet 654 of FIG. 6). Public Internet 754 can be communicatively coupled to the NAT gateway 738 contained in the control plane VCN 716. The service gateway 736 contained in the control plane VCN 716 can be communicatively couple to cloud services 756 (e.g. cloud services 656 of FIG. 6).

In some examples, the data plane VCN 718 can be contained in the customer tenancy 721. In this case, the IaaS provider may provide the control plane VCN 716 for each customer, and the IaaS provider may, for each customer, set up a unique compute instance 744 that is contained in the service tenancy 719. Each compute instance 744 may allow communication between the control plane VCN 716, contained in the service tenancy 719, and the data plane VCN 718 that is contained in the customer tenancy 721. The compute instance 744 may allow resources, that are provisioned in the control plane VCN 716 that is contained in the service tenancy 719, to be deployed or otherwise used in the data plane VCN 718 that is contained in the customer tenancy 721.

In other examples, the customer of the IaaS provider may have databases that live in the customer tenancy 721. In this example, the control plane VCN 716 can include the data plane mirror app tier 740 that can include app subnet(s) 726. The data plane mirror app tier 740 can reside in the data plane VCN 718, but the data plane mirror app tier 740 may not live in the data plane VCN 718. That is, the data plane mirror app tier 740 may have access to the customer tenancy 721, but the data plane mirror app tier 740 may not exist in the data plane VCN 718 or be owned or operated by the customer of the IaaS provider. The data plane mirror app tier 740 may be configured to make calls to the data plane VCN 718 but may not be configured to make calls to any entity contained in the control plane VCN 716. The customer may desire to deploy or otherwise use resources in the data plane VCN 718 that are provisioned in the control plane VCN 716, and the data plane mirror app tier 740 can facilitate the desired deployment, or other usage of resources, of the customer.

In some embodiments, the customer of the IaaS provider can apply filters to the data plane VCN 718. In this embodiment, the customer can determine what the data plane VCN 718 can access, and the customer may restrict access to public Internet 754 from the data plane VCN 718. The IaaS provider may not be able to apply filters or otherwise control access of the data plane VCN 718 to any outside networks or databases. Applying filters and controls by the customer onto the data plane VCN 718, contained in the customer tenancy 721, can help isolate the data plane VCN 718 from other customers and from public Internet 754.

In some embodiments, cloud services 756 can be called by the service gateway 736 to access services that may not exist on public Internet 754, on the control plane VCN 716, or on the data plane VCN 718. The connection between cloud services 756 and the control plane VCN 716 or the data plane VCN 718 may not be live or continuous. Cloud services 756 may exist on a different network owned or operated by the IaaS provider. Cloud services 756 may be configured to receive calls from the service gateway 736 and may be configured to not receive calls from public Internet 754. Some cloud services 756 may be isolated from other cloud services 756, and the control plane VCN 716 may be isolated from cloud services 756 that may not be in the same region as the control plane VCN 716. For example, the control plane VCN 716 may be located in "Region 1," and cloud service "Deployment 6," may be located in Region 1 and in "Region 2." If a call to Deployment 6 is made by the service gateway 736 contained in the control plane VCN 716 located in Region 1, the call may be transmitted to Deployment 6 in Region 1. In this example, the control plane VCN 716, or Deployment 6 in Region 1, may not be communicatively coupled to, or otherwise in communication with, Deployment 6 in Region 2.

Figure 8:
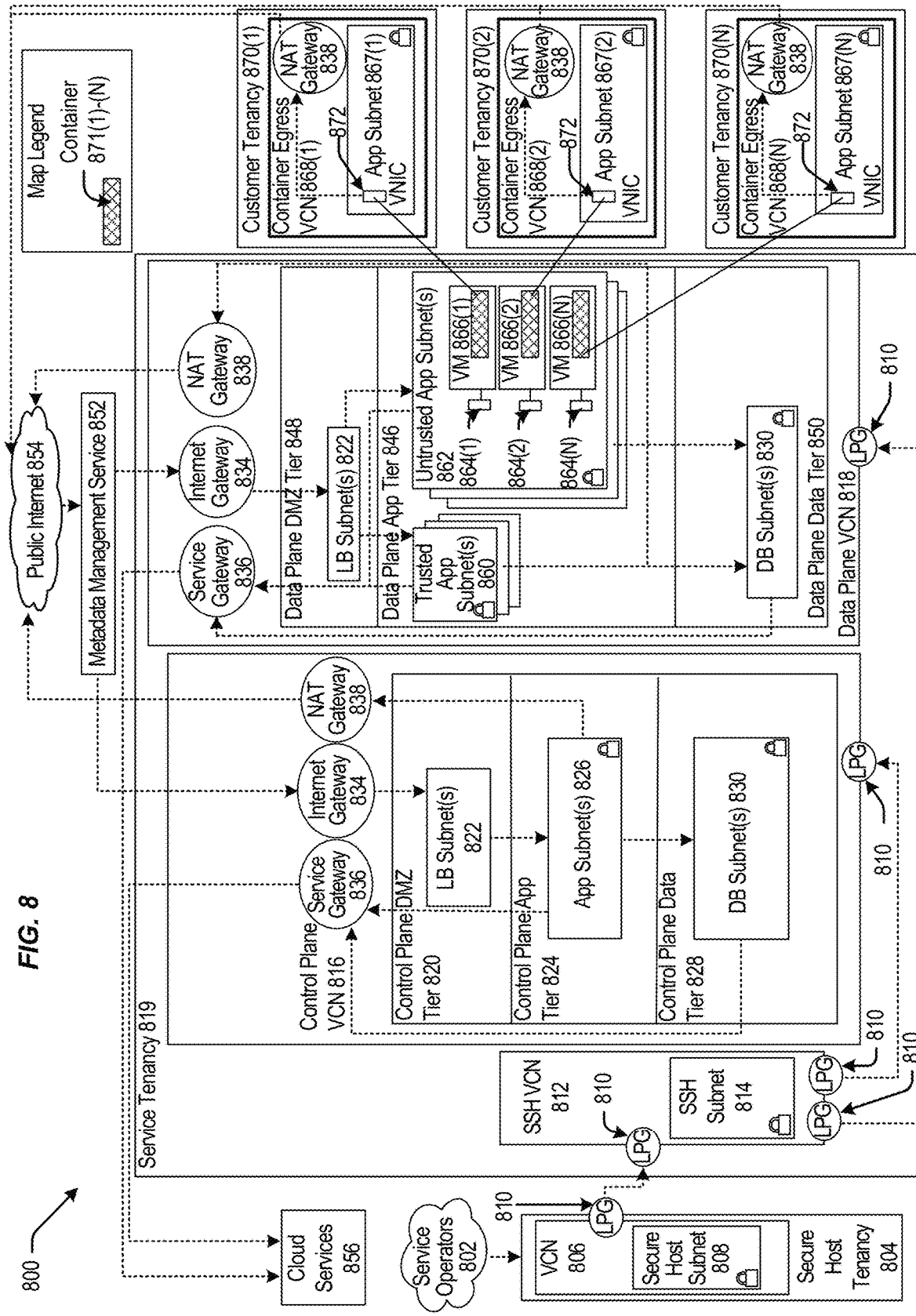
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g. service operators 602 of FIG. 6) can be communicatively coupled to a secure host tenancy 804 (e.g. the secure host tenancy 604 of FIG. 6) that can include a virtual cloud network (VCN) 806 (e.g. the VCN 606 of FIG. 6) and a secure host subnet 808 (e.g. the secure host subnet 608 of FIG. 6). The VCN 806 can include an LPG 810 (e.g. the LPG 610 of FIG. 6) that can be communicatively coupled to an SSH VCN 812 (e.g. the SSH VCN 612 of FIG. 6) via an LPG 810 contained in the SSH VCN 812. The SSH VCN 812 can include an SSH subnet 814 (e.g. the SSH subnet 614 of FIG. 6), and the SSH VCN 812 can be communicatively coupled to a control plane VCN 816 (e.g. the control plane VCN 616 of FIG. 6) via an LPG 810 contained in the control plane VCN 816 and to a data plane VCN 818 (e.g. the data plane 618 of FIG. 6) via an LPG 810 contained in the data plane VCN 818. The control plane VCN 816 and the data plane VCN 818 can be contained in a service tenancy 819 (e.g. the service tenancy 619 of FIG. 6).

The control plane VCN 816 can include a control plane DMZ tier 820 (e.g. the control plane DMZ tier 620 of FIG. 6) that can include load balancer (LB) subnet(s) 822 (e.g. LB subnet(s) 622 of FIG. 6), a control plane app tier 824 (e.g. the control plane app tier 624 of FIG. 6) that can include app subnet(s) 826 (e.g. similar to app subnet(s) 626 of FIG. 6), a control plane data tier 828 (e.g. the control plane data tier 628 of FIG. 6) that can include DB subnet(s) 830. The LB subnet(s) 822 contained in the control plane DMZ tier 820 can be communicatively coupled to the app subnet(s) 826 contained in the control plane app tier 824 and to an Internet gateway 834 (e.g. the Internet gateway 634 of FIG. 6) that can be contained in the control plane VCN 816, and the app subnet(s) 826 can be communicatively coupled to the DB subnet(s) 830 contained in the control plane data tier 828 and to a service gateway 836 (e.g. the service gateway of FIG. 6) and a network address translation (NAT) gateway 838 (e.g. the NAT gateway 638 of FIG. 6). The control plane VCN 816 can include the service gateway 836 and the NAT gateway 838.

The data plane VCN 818 can include a data plane app tier 846 (e.g. the data plane app tier 646 of FIG. 6), a data plane DMZ tier 848 (e.g. the data plane DMZ tier 648 of FIG. 6), and a data plane data tier 850 (e.g. the data plane data tier 650 of FIG. 6). The data plane DMZ tier 848 can include LB subnet(s) 822 that can be communicatively coupled to trusted app subnet(s) 860 and untrusted app subnet(s) 862 of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include one or more primary VNICs 864(1)-(N) that can be communicatively coupled to tenant virtual machines (VMs) 866(1)-(N). Each tenant VM 866(1)-(N) can be communicatively coupled to a respective app subnet 867(1)-(N) that can be contained in respective container egress VCNs 868(1)-(N) that can be contained in respective customer tenancies 870(1)-(N). Respective secondary VNICs 872(1)-(N) can facilitate communication between the untrusted app subnet(s) 862 contained in the data plane VCN 818 and the app subnet contained in the container egress VCNs 868(1)-(N). Each container egress VCNs 868(1)-(N) can include a NAT gateway 838 that can be communicatively coupled to public Internet 854 (e.g. public Internet 654 of FIG. 6).

The Internet gateway 834 contained in the control plane VCN 816 and contained in the data plane VCN 818 can be communicatively coupled to a metadata management service 852 (e.g. the metadata management system 652 of FIG. 6) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some embodiments, the data plane VCN 818 can be integrated with customer tenancies 870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 846. Code to run the function may be executed in the VMs 866(1)-(N), and the code may not be configured to run anywhere else on the data plane VCN 818. Each VM 866(1)-(N) may be connected to one customer tenancy 870. Respective containers 871(1)-(N) contained in the VMs 866(1)-(N) may be configured to run the code. In this case, there can be a dual isolation (e.g., the containers 871(1)-(N) running code, where the containers 871(1)-(N) may be contained in at least the VM 866(1)-(N) that are contained in the untrusted app subnet(s) 862), which may help prevent incorrect or otherwise undesirable code from damaging the network of the IaaS provider or from damaging a network of a different customer. The containers 871(1)-(N) may be communicatively coupled to the customer tenancy 870 and may be configured to transmit or receive data from the customer tenancy 870. The containers 871(1)-(N) may not be configured to transmit or receive data from any other entity in the data plane VCN 818. Upon completion of running the code, the IaaS provider may kill or otherwise dispose of the containers 871(1)-(N).

In some embodiments, the trusted app subnet(s) 860 may run code that may be owned or operated by the IaaS provider. In this embodiment, the trusted app subnet(s) 860 may be communicatively coupled to the DB subnet(s) 830 and be configured to execute CRUD operations in the DB subnet(s) 830. The untrusted app subnet(s) 862 may be communicatively coupled to the DB subnet(s) 830, but in this embodiment, the untrusted app subnet(s) may be configured to execute read operations in the DB subnet(s) 830. The containers 871(1)-(N) that can be contained in the VM 866(1)-(N) of each customer and that may run code from the customer may not be communicatively coupled with the DB subnet(s) 830.

In other embodiments, the control plane VCN 816 and the data plane VCN 818 may not be directly communicatively coupled. In this embodiment, there may be no direct communication between the control plane VCN 816 and the data plane VCN 818. However, communication can occur indirectly through at least one method. An LPG 810 may be established by the IaaS provider that can facilitate communication between the control plane VCN 816 and the data plane VCN 818. In another example, the control plane VCN 816 or the data plane VCN 818 can make a call to cloud services 856 via the service gateway 836. For example, a call to cloud services 856 from the control plane VCN 816 can include a request for a service that can communicate with the data plane VCN 818.

Figure 9:
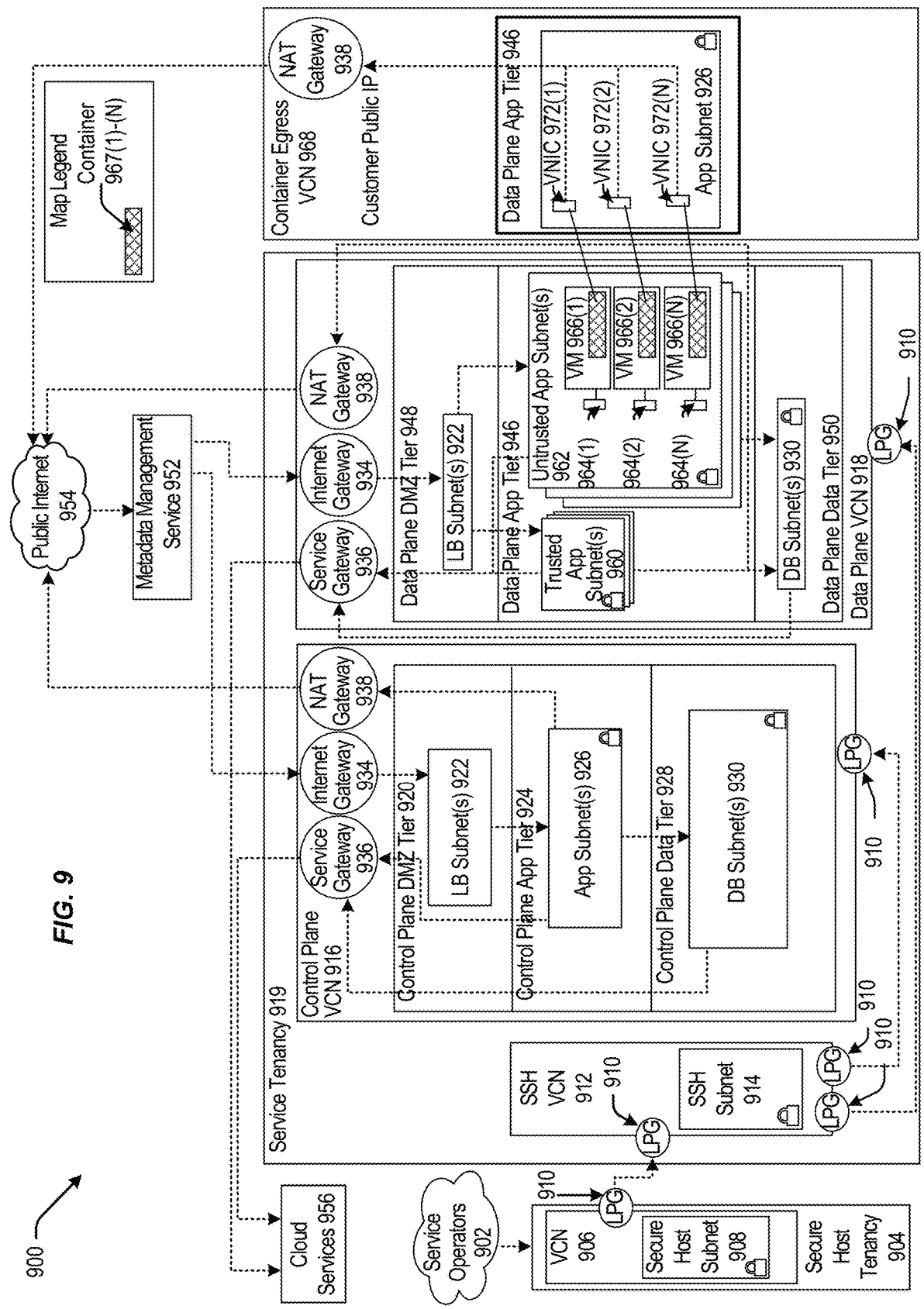
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 602 of FIG. 6) can be communicatively coupled to a secure host tenancy 904 (e.g. the secure host tenancy 604 of FIG. 6) that can include a virtual cloud network (VCN) 906 (e.g. the VCN 606 of FIG. 6) and a secure host subnet 908 (e.g. the secure host subnet 608 of FIG. 6). The VCN 906 can include an LPG 910 (e.g. the LPG 610 of FIG. 6) that can be communicatively coupled to an SSH VCN 912 (e.g. the SSH VCN 612 of FIG. 6) via an LPG 910 contained in the SSH VCN 912. The SSH VCN 912 can include an SSH subnet 914 (e.g. the SSH subnet 614 of FIG. 6), and the SSH VCN 912 can be communicatively coupled to a control plane VCN 916 (e.g. the control plane VCN 616 of FIG. 6) via an LPG 910 contained in the control plane VCN 916 and to a data plane VCN 918 (e.g. the data plane 618 of FIG. 6) via an LPG 910 contained in the data plane VCN 918. The control plane VCN 916 and the data plane VCN 918 can be contained in a service tenancy 919 (e.g. the service tenancy 619 of FIG. 6).

The control plane VCN 916 can include a control plane DMZ tier 920 (e.g. the control plane DMZ tier 620 of FIG. 6) that can include LB subnet(s) 922 (e.g. LB subnet(s) 622 of FIG. 6), a control plane app tier 924 (e.g. the control plane app tier 624 of FIG. 6) that can include app subnet(s) 926 (e.g. app subnet(s) 626 of FIG. 6), a control plane data tier 928 (e.g. the control plane data tier 628 of FIG. 6) that can include DB subnet(s) 930 (e.g. DB subnet(s) 830 of FIG. 8). The LB subnet(s) 922 contained in the control plane DMZ tier 920 can be communicatively coupled to the app subnet(s) 926 contained in the control plane app tier 924 and to an Internet gateway 934 (e.g. the Internet gateway 634 of FIG. 6) that can be contained in the control plane VCN 916, and the app subnet(s) 926 can be communicatively coupled to the DB subnet(s) 930 contained in the control plane data tier 928 and to a service gateway 936 (e.g. the service gateway of FIG. 6) and a network address translation (NAT) gateway 938 (e.g. the NAT gateway 638 of FIG. 6). The control plane VCN 916 can include the service gateway 936 and the NAT gateway 938.

The data plane VCN 918 can include a data plane app tier 946 (e.g. the data plane app tier 646 of FIG. 6), a data plane DMZ tier 948 (e.g. the data plane DMZ tier 648 of FIG. 6), and a data plane data tier 950 (e.g. the data plane data tier 650 of FIG. 6). The data plane DMZ tier 948 can include LB subnet(s) 922 that can be communicatively coupled to trusted app subnet(s) 960 (e.g. trusted app subnet(s) 860 of FIG. 8) and untrusted app subnet(s) 962 (e.g. untrusted app subnet(s) 862 of FIG. 8) of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include primary VNICs 964(1)-(N) that can be communicatively coupled to tenant virtual machines (VMs) 966(1)-(N) residing within the untrusted app subnet(s) 962. Each tenant VM 966(1)-(N) can run code in a respective container 967(1)-(N), and be communicatively coupled to an app subnet 926 that can be contained in a data plane app tier 946 that can be contained in a container egress VCN 968. Respective secondary VNICs 972(1)-(N) can facilitate communication between the untrusted app subnet(s) 962 contained in the data plane VCN 918 and the app subnet contained in the container egress VCN 968. The container egress VCN can include a NAT gateway 938 that can be communicatively coupled to public Internet 954 (e.g. public Internet 654 of FIG. 6).

The Internet gateway 934 contained in the control plane VCN 916 and contained in the data plane VCN 918 can be communicatively coupled to a metadata management service 952 (e.g. the metadata management system 652 of FIG. 6) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some examples, the pattern illustrated by the architecture of block diagram 900 of FIG. 9 may be considered an exception to the pattern illustrated by the architecture of block diagram 800 of FIG. 8 and may be desirable for a customer of the IaaS provider if the IaaS provider cannot directly communicate with the customer (e.g., a disconnected region). The respective containers 967(1)-(N) that are contained in the VMs 966(1)-(N) for each customer can be accessed in real-time by the customer. The containers 967(1)-(N) may be configured to make calls to respective secondary VNICs 972(1)-(N) contained in app subnet(s) 926 of the data plane app tier 946 that can be contained in the container egress VCN 968. The secondary VNICs 972(1)-(N) can transmit the calls to the NAT gateway 938 that may transmit the calls to public Internet 954. In this example, the containers 967(1)-(N) that can be accessed in real-time by the customer can be isolated from the control plane VCN 916 and can be isolated from other entities contained in the data plane VCN 918. The containers 967(1)-(N) may also be isolated from resources from other customers.

In other examples, the customer can use the containers 967(1)-(N) to call cloud services 956. In this example, the customer may run code in the containers 967(1)-(N) that requests a service from cloud services 956. The containers 967(1)-(N) can transmit this request to the secondary VNICs 972(1)-(N) that can transmit the request to the NAT gateway that can transmit the request to public Internet 954. Public Internet 954 can transmit the request to LB subnet(s) 922 contained in the control plane VCN 916 via the Internet gateway 934. In response to determining the request is valid, the LB subnet(s) can transmit the request to app subnet(s) 926 that can transmit the request to cloud services 956 via the service gateway 936.

It should be appreciated that IaaS architectures 600, 700, 800, 900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 10:
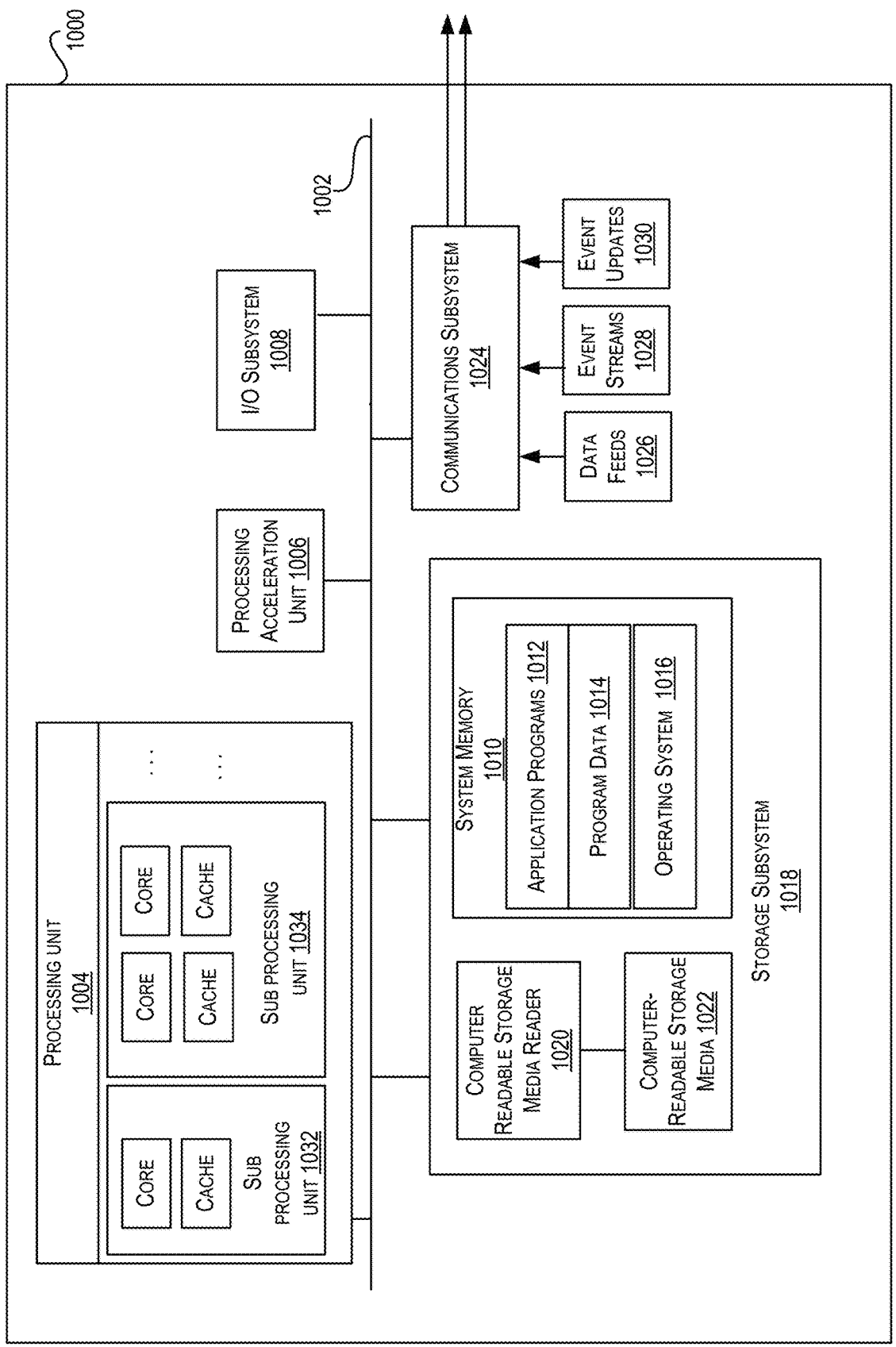
FIG. 10 is a block diagram illustrating an example computer system, according to at least one embodiment.

FIG. 10 illustrates an example computer system 1000, in which various embodiments may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present disclosure.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
   determining, by a computer system, a plurality of weights respectively for a plurality of parameter values, wherein a weight of each particular parameter value of the plurality of parameter values is associated with a probability of selecting a sample having the particular parameter value;
   randomly selecting, by the computer system and based at least in part on the plurality of weights, a first parameter value of the plurality of parameter values, the first parameter value to be used for selecting a first sample;
   selecting, by the computer system, the first sample of a plurality of samples corresponding to a first batch of data records according to the first parameter value, for processing via a first external invocation;
   invoking the processing of the first sample via the first external invocation;

determining, by the computer system, feedback data associated with a level of performance of the first external invocation;

adjusting, by the computer system, the initial plurality of weights corresponding respectively to the plurality of parameter values based at least in part on the feedback data;

randomly selecting, by the computer system and based at least in part on the adjusted plurality of weights, a second parameter value of the plurality of parameter values, the second parameter value to be used for selecting a second sample;

selecting, by the computer system, the second sample of the plurality of samples corresponding to a second batch of data records according to the second parameter value, for processing via a second external invocation; and invoking the processing of the second sample via the second external invocation.

2. The computer-implemented method of claim 1, further comprising determining the plurality of weights according to a probability distribution.

3. The computer-implemented method of claim 1, wherein the plurality of parameter values correspond to a set of batch size values, each particular batch size value indicating a number of a subset of the plurality of data records, the number of the subset of plurality of data records being further associated with the first sample that is processed via the first external invocation.

4. The computer-implemented method of claim 1, wherein a data record includes at least one of (I) a text, (II) an image, or (III) a video, and wherein the first external invocation corresponds to a request that is transmitted to a cloud computing provider, the cloud computing provider performing one or more operations to enrich the data record by determining supplementary information from the data record.

5. The computer-implemented method of claim 1, wherein the first external invocation is associated with a fourth plurality of samples that is a subset of the plurality of samples, the fourth plurality of samples including the first sample and a third sample.

6. The computer-implemented method of claim 5, wherein a selection of samples for inclusion among the fourth plurality of samples is performed with replacement, and wherein the third sample is also associated with the first parameter value.

7. The computer-implemented method of claim 1, wherein the first sample is associated with a plurality of parameters that includes the particular parameter, the plurality of parameters being associated with at least one of: (I) a number of data records of the first sample, (II) a time interval between transmission of the first sample and a previous transmission of another sample of the first external invocation, or (III) a number of bits associated with the first sample.

8. The computer-implemented method of claim 1, wherein the level of performance of the first external invocation is associated with a response time interval between transmission of the first sample to a server computer and receipt of a response to the transmission that includes enriched data from the server computer.

9. The computer-implemented method of claim 1, wherein potential values of the plurality of parameter values are unique values, and wherein the plurality of parameter values remains fixed between external invocations that are executed to process the plurality of samples.

10. The method of claim 1, wherein the probability distribution comprises a uniform probability distribution.

11. A computer system, comprising:
a memory configured to store computer-executable instructions; and
one or more processors in communication with the memory and configured to access the memory and execute the computer-executable instructions to at least:
determine, by the computer system, a plurality of weights respectively for a plurality of parameter values, wherein a weight of each particular parameter value of the plurality of parameter values is associated with a probability of selecting a sample having the particular parameter value;
randomly select, by the computer system and based at least in part on the plurality of weights, a first parameter value of the plurality of parameter values, the first parameter value to be used for selecting a first sample;
select, by the computer system, the first sample of a plurality of samples corresponding to a first batch of data records according to the first parameter value, for processing via a first external invocation;
invoke the processing of the first sample via the first external invocation;
determine, by the computer system, feedback data associated with a level of performance of the first external invocation;
adjust, by the computer system, the plurality of weights corresponding respectively to the plurality of parameter values based at least in part on the feedback data;
select, by the computer system and based at least in part on a particular adjusted weight of the plurality of weights, a second parameter value;
randomly select, by the computer system and based at least in part on the adjusted plurality of weights, a second parameter value of the plurality of parameter values, the second parameter value to be used for selecting a second sample;
select, by the computer system, the second sample of the plurality of samples corresponding to a second batch of data records according to the second parameter value, for processing via a second external invocation; and
invoke the processing of the second sample via the second external invocation.

12. The computer system of claim 11, wherein the first external invocation is associated with a third plurality of samples that is a subset of the plurality of samples, and wherein a selection of samples for inclusion among the third plurality of samples is performed with replacement.

13. The computer system of claim 12, wherein the plurality of parameter values corresponds to a population size, and wherein the instructions further comprise:
determining a percentage of the population size; and
selecting a percentage of samples from the plurality of samples as one or more additional samples, wherein both the one or more additional samples and the third plurality of samples are processed via the first external invocation.

14. The computer system of claim 13, wherein the additional samples are selected independently from the respective weights of parameter values of the plurality of parameter values.

15. The computer system of claim 13, wherein the percentage of the population size remains a fixed size between external invocations.

16. The computer system of claim 12, wherein requests for processing samples of the third plurality of samples are transmitted in parallel to a server computer that is configured to process the requests in parallel.

17. The computer system of claim 13, wherein the feedback data corresponds to measurements that are measured based at least in part on response data that is received in association with respective requests for processing samples of the third plurality of samples.

18. The computer system of claim 11, wherein the first external invocation corresponds to an initial external invocation that is used to process a first portion of the plurality of data records, and wherein the respective weights of parameter values of the plurality of parameter values are determined to be a same value for the initial external invocation such that a probability that a particular parameter value is selected is associated with a uniform probability distribution.

19. One or more non-transitory computer-readable media comprising computer-executable instructions that, when executed by one or more processors of a computer system, cause the one or more processors to perform operations comprising:
    determining, by the computer system, a plurality of weights respectively for a plurality of parameter values, wherein a weight of each particular parameter value of the plurality of parameter values is associated with a probability of selecting a sample having the particular parameter value;
    randomly selecting, by the computer system and based at least in part on the plurality of weights, a first parameter value of the plurality of parameter values, the first parameter value to be used for selecting a first sample;
    selecting, by the computer system, a first sample of a plurality of samples corresponding to a first batch of data records according to the first parameter value, for processing via a first external invocation;
    invoking the processing of the first sample via the first external invocation;
    determining, by the computer system, feedback data associated with a level of performance of the first external invocation;
    adjusting, by the computer system, the plurality of weights corresponding to the plurality of parameter values based at least in part on the feedback data;
    randomly selecting, by the computer system and based at least in part on the adjusted plurality of weights, a second parameter value of the plurality of parameter values, the second parameter value to be used for selecting a second sample;
    selecting, by the computer system, the second sample of the plurality of samples corresponding to a second batch of data records according to the second parameter value, for processing via a second external invocation; and
    invoking the processing of the second sample via the second external invocation.

20. The one or more non-transitory computer-readable media of claim 19, wherein the adjustment of the initial weights corresponds to increasing the second parameter value relative to other parameter values of the plurality of parameter values.

* * * * *